United States Patent
Yeo et al.

(10) Patent No.: US 12,069,618 B2
(45) Date of Patent: Aug. 20, 2024

(54) METHOD AND DEVICE FOR TRANSMITTING/RECEIVING SIGNALS IN COMMUNICATION SYSTEM

(71) Applicant: Samsung Electronics Co., Ltd., Suwon-si (KR)

(72) Inventors: Jeongho Yeo, Suwon-si (KR);
Taehyoung Kim, Suwon-si (KR);
Hyunseok Ryu, Suwon-si (KR);
Jinyoung Oh, Suwon-si (KR);
Cheolkyu Shin, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 387 days.

(21) Appl. No.: 17/599,129

(22) PCT Filed: Apr. 1, 2020

(86) PCT No.: PCT/KR2020/004465
§ 371 (c)(1),
(2) Date: Sep. 28, 2021

(87) PCT Pub. No.: WO2020/204603
PCT Pub. Date: Oct. 8, 2020

(65) Prior Publication Data
US 2022/0159626 A1     May 19, 2022

(30) Foreign Application Priority Data
Apr. 1, 2019  (KR) .................. 10-2019-0037932

(51) Int. Cl.
*H04W 72/02* (2009.01)
*H04W 72/04* (2023.01)
(Continued)

(52) U.S. Cl.
CPC .......... *H04W 72/02* (2013.01); *H04W 72/044* (2013.01); *H04W 72/20* (2023.01); *H04W 92/18* (2013.01)

(58) Field of Classification Search
CPC ... H04W 72/02; H04W 72/044; H04W 72/20; H04W 92/18; H04W 4/70; H04W 72/23;
(Continued)

(56) References Cited

U.S. PATENT DOCUMENTS

2018/0343089 A1  11/2018  Park et al.
2019/0090250 A1   3/2019  Lee et al.
(Continued)

FOREIGN PATENT DOCUMENTS

KR    10-2019-0127193 A    11/2019
KR    10-2019-0129647 A    11/2019
(Continued)

OTHER PUBLICATIONS

European Search Report dated Apr. 4, 2022; European Appln. No. 20781752.9-1205 / 3934350 PCT/KR2020004465.
(Continued)

*Primary Examiner* — Luat Phung
(74) *Attorney, Agent, or Firm* — Jefferson IP Law, LLP

(57) ABSTRACT

The disclosure relates to a communication method and system for converging a 5th-Generation (5G) communication system for supporting higher data rates beyond a 4th-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. In addition, according to the disclosure, a method of a terminal in a wireless communication system comprises the steps of:
(Continued)

receiving, from a base station, configuration information including first bandwidth part (BWP) configuration information on a sidelink and information on a resource pool; identifying a resource pool for the sidelink based on the configuration information; and performing communication with another terminal based on the resource pool, wherein the information on the resource pool includes the lowest physical resource block (PRB) index of the resource pool.

10 Claims, 18 Drawing Sheets

(51) Int. Cl.
  *H04W 72/044* (2023.01)
  *H04W 72/20* (2023.01)
  *H04W 92/18* (2009.01)

(58) Field of Classification Search
  CPC .............. H04W 72/0453; H04W 72/53; H04L 5/0053; H04L 5/0007; H04L 5/001; H04L 5/0094
  See application file for complete search history.

(56) References Cited

U.S. PATENT DOCUMENTS

| | | | | |
|---|---|---|---|---|
| 2019/0335532 A1* | 10/2019 | Kim | ............ | H04W 72/02 |
| 2019/0364602 A1* | 11/2019 | Yi | ............ | H04W 74/0833 |
| 2020/0100215 A1* | 3/2020 | Li | ............ | H04L 5/0082 |
| 2020/0112982 A1* | 4/2020 | Li | ............ | H04W 72/23 |
| 2021/0160872 A1* | 5/2021 | Lin | ............ | H04W 4/40 |
| 2021/0219268 A1* | 7/2021 | Li | ............ | H04W 72/20 |
| 2021/0243711 A1 | 8/2021 | Yeo et al. | | |
| 2021/0274541 A1 | 9/2021 | Yeo et al. | | |
| 2021/0400663 A1* | 12/2021 | Lee | ............ | H04W 72/25 |

FOREIGN PATENT DOCUMENTS

| | | | |
|---|---|---|---|
| WO | 2017/176099 | A1 | 10/2017 |
| WO | 2019/050316 | A1 | 3/2019 |

OTHER PUBLICATIONS

Huawei et al.; Sidelink physical layer structure for NR V2X; 3GPP TSG RAN WG1 Meeting #96; R1-1901536; Feb. 25-Mar. 1, 2019; Athens, Greece.

Gotsis; "Experimenting with Flexible D2D Communications in Current and Future LTE Networks: A D2D Radio Technology Primer & SOftware Modem Implementation;" WInnComm Europe 2017 Papers and Presentations; Wireless Innovation Forum; May 17-18, 2017; University of Oulu, Finland.

Spreadtrum Communications; Discussion on NR sidelink physical layer structure; 3GPP TSG RAN WG1 Ad-Hoc Meeting 1901; R1-1900713; Jan. 21-25, 2019; Taipei.

Ericsson; Details on physical layer structure for SL V2X; 3GPP TSG-RAN WG1 Meeting # ah-1901; R1-1901211; Jan. 21-25, 2019; Taipei, Taiwan.

European Office Action dated Jan. 29, 2024, issued in European Application No. 20 781 752.9.

* cited by examiner

METHOD AND DEVICE FOR TRANSMITTING/RECEIVING SIGNALS IN COMMUNICATION SYSTEM

TECHNICAL FIELD

The disclosure relates to a communication system, and to a method and device for transmitting/receiving downlink, uplink, and sidelink signals. Particularly, the disclosure relates to a method for defining a control information resource set for transmission of control information in a sidelink and to a method for mapping a sidelink control information signal. In addition, the disclosure relates to a method for configuring a bandwidth part (BWP) in a Uu link which is a communication link with a base station, and a BWP in a sidelink which is a communication link between terminals, and to a method and device for signal transmission/reception of a terminal according thereto.

BACKGROUND ART

To meet the demand for wireless data traffic having increased since deployment of 4th generation (4G) communication systems, efforts are being made to develop an improved 5th generation (5G) or pre-5G communication system. Therefore, the 5G or pre-5G communication system is also called a 'Beyond 4G Network' or a 'Post long term evolution (LTE) System'. The 5G communication system established by the 3rd generation partnership project (3GPP) is called a new radio (NR) system. The 5G communication system is considered to be implemented in extremely high frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are being discussed and adopted in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology are being developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as sensing technology, wired/wireless communication and network infrastructure, service interface technology, and security technology have been required for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply the 5G communication system to the IoT network. For example, technologies such as a sensor network, machine type communication (MTC), and machine-to-machine (M2M) communication are being implemented on the basis of 5G communication technologies such as beamforming, MIMO, and an array antenna. The use of a cloud radio access network (cloud RAN) for big data processing technology is one example of convergence between the 5G technology and the IoT technology.

DISCLOSURE OF INVENTION

Technical Problem

In a wireless communication system, especially, a new radio (NR) system, a bandwidth part is defined in a downlink and an uplink, and a terminal is allowed to transmit or receive a signal only within the defined bandwidth part. That is, the terminal can perform transmission/reception operation only within a configured specific frequency bandwidth rather than the entire system frequency bandwidth. In addition, a control channel region is configured within a specific bandwidth part, and the terminal is allowed to decode and receive downlink control information in the configured control channel region.

Meanwhile, a sidelink may be used to enable communication between terminals based on NR. In order to use the sidelink, a bandwidth part in the sidelink may be defined, and a control channel region may be configured in that bandwidth part. In the control channel region, certain terminals may transmit control signals, and certain terminals may receive control signals. The disclosure provides a method and device for configuring a control channel region in a sidelink so as to perform the above operations, and provides a slot structure for transmitting and receiving a sidelink signal.

Solution to Problem

In order to solve the above problems, the disclosure provides communication between terminals in a communication system characterized by including steps of receiving a configuration related to a control channel from a base station and transmitting or receiving a control signal based on the configuration.

According to another aspect of the disclosure, the disclosure provides communication between terminals in a communication system characterized by including steps of performing channel access and transmitting a preamble.

In addition, to solve the above problems, the disclosure provides a method of a terminal in a wireless communication system that includes receiving, from a base station, configuration information including first bandwidth part (BWP) configuration information on a sidelink and information on a resource pool; identifying a resource pool for a sidelink, based on the configuration information; and performing communication with another terminal, based on the resource pool, wherein the information on the resource pool includes a lowest physical resource block (PRB) index of the resource pool.

In addition, to solve the above problems, the disclosure provides a terminal in a wireless communication system that includes a transceiver; and a controller configured to receive, from a base station via the transceiver, configuration information including first bandwidth part (BWP) configuration information on a sidelink and information on a resource pool, to identify a resource pool for a sidelink, based on the configuration information, and to perform communication with another terminal, based on the resource pool, wherein the information about the resource pool includes a lowest physical resource block (PRB) index of the resource pool.

Advantageous Effects of Invention

The disclosure defines a region for transmission and reception of a control channel in a sidelink for communication between terminals and provides a transmission/reception operation in the control channel region so as to realize smooth sidelink transmission/reception between terminals.

MODE FOR THE INVENTION

Figure 1:
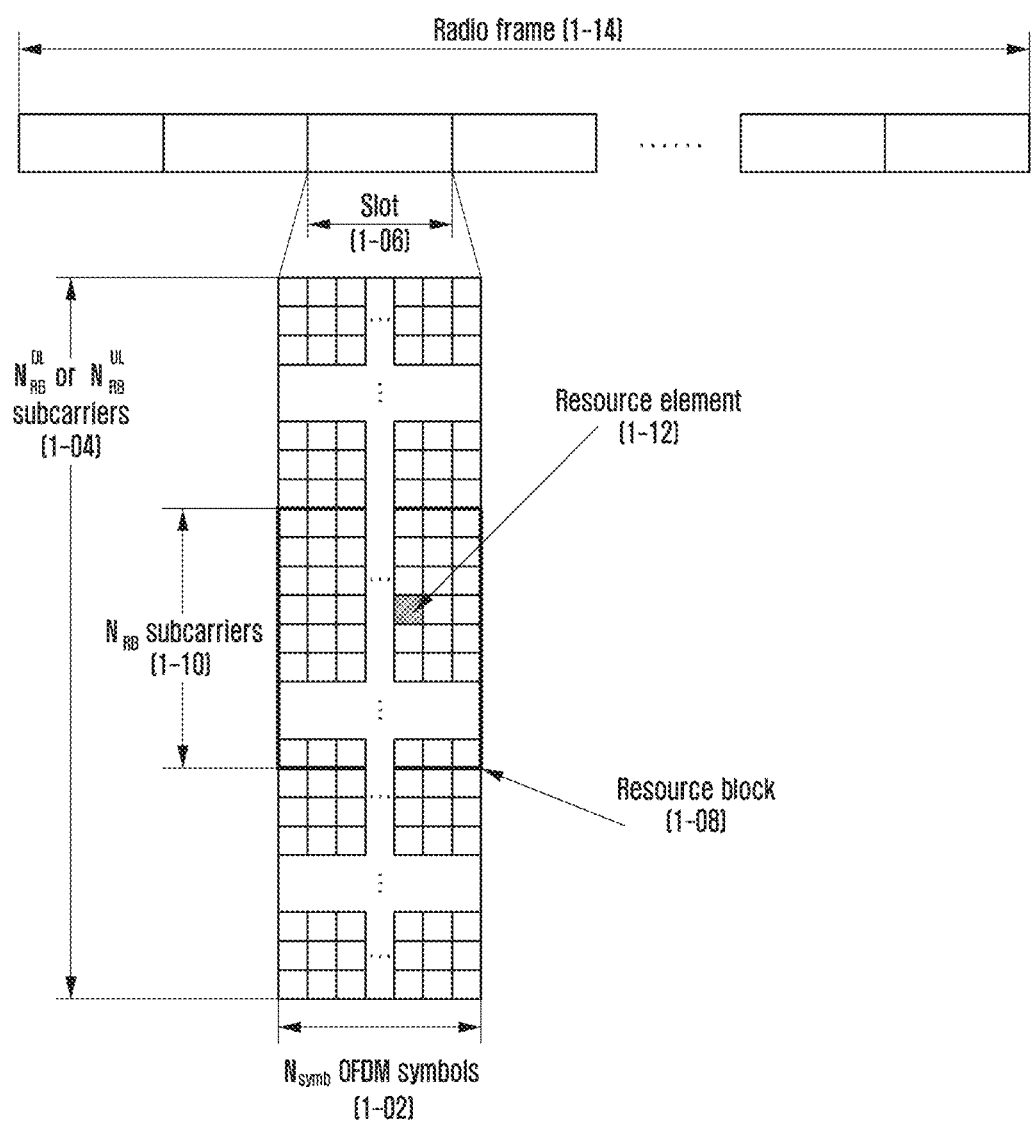
FIG. 1 is a diagram illustrating a time-frequency domain transmission structure in downlink or uplink of a new radio system.

To meet the demand for wireless data traffic having increased since deployment of 4th generation (4G) communication systems, efforts are being made to develop an improved 5th generation (5G) or pre-5G communication system. Therefore, the 5G or pre-5G communication system is also called a 'Beyond 4G Network' or a 'Post long term evolution (LTE) System'. The 5G communication system established by the 3rd generation partnership project (3GPP) is called a new radio (NR) system. The 5G communication system is considered to be implemented in extremely high frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques have been discussed and adopted in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology are being developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as sensing technology, wired/wireless communication and network infrastructure, service interface technology, and security technology have been required for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply the 5G communication system to the IoT network. For example, technologies such as a sensor network, machine type communication (MTC), and machine-to-machine (M2M) communication are being implemented on the basis of 5G communication technologies such as beamforming, MIMO, and an array antenna. The use of a cloud radio access network (cloud RAN) for big data processing technology is one example of convergence between the 5G technology and the IoT technology.

Meanwhile, New Radio access technology (NR), which is a new 5G communication, is being designed to allow various services to be freely multiplexed in time and frequency resources, and thus waveform/numerology, reference signals, etc. may be dynamically or freely allocated according to needs of the corresponding service. In order to provide an optimal service to a UE in wireless communication, it is important to optimize data transmission through measurement of channel quality and interference, and it is essential to measure an accurate channel state. However, unlike 4G communication where channel and interference characteristics do not change significantly depending on frequency resources, 5G channel is subject to a great change in the channel and interference characteristics depending on the service, so it is necessary to support a subset of frequency resource group (FRG) dimension for measuring them separately. Meanwhile, in the NR system, the types of supported services may be divided into categories such as enhanced mobile broadband (eMBB), massive machine type communications (mMTC), and ultra-reliable and low-latency communications (URLLC). The eMBB is a service that aims for a high-speed transmission of high-capacity data, the mMTC is a service that aims for UE power minimization and connectivity of multiple UEs, and the URLLC is a service that aims for high reliability and low latency. Depending on the type of service applied to the UE, different requirements may be applied.

Meanwhile, as research on the next-generation communication system progresses, various methods for scheduling communication with a UE are being discussed. In this regard, there is a need for an efficient scheduling and data transmission/reception method in consideration of the characteristics of the next-generation communication system.

As such, a plurality of services may be provided to a user in the communication system, and a method and device for providing respective services within the same time section in accordance with their characteristics may be required.

Hereinafter, embodiments of the disclosure will be described in detail with reference to the accompanying drawings.

In describing embodiments, descriptions of technical contents that are well known in the technical field to which the disclosure pertains and are not directly related to the disclosure will be omitted. This is to more clearly convey the subject matter of the disclosure without obscuring it by omitting unnecessary description.

For the same reason, some elements are exaggerated, omitted, or schematically illustrated in the accompanying drawings. In addition, the depicted size of each element does not fully reflect the actual size. In the drawings, the same or corresponding elements are assigned the same reference numerals.

The advantages and features of the disclosure and the manner of achieving them will become apparent through embodiments described below with reference to the accompanying drawings. The disclosure may be, however, embodied in many different forms and should not be construed as being limited to the embodiments set forth herein. Rather, these embodiments are provided so that the disclosure will be thorough and complete and will fully convey the scope of the disclosure to those skilled in the art. The disclosure is only defined by the scope of the appended claims. Throughout the specification, the same reference numerals refer to the same constitutional elements.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block(s). These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block(s). The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block(s).

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term "unit" refers to a software element or a hardware element, such as a field programmable gate array (FPGA) or an application specific integrated circuit (ASIC), which performs a predetermined function. However, the term "unit" does not always have a meaning limited to software or hardware. A "unit" may be constructed either to be stored in an addressable storage medium or to execute one or more processors. Therefore, a "unit" includes, for example, software elements, object-oriented software elements, class elements or task elements, processes, functions, properties, procedures, subroutines, segments of a program code, drivers, firmware, micro-codes, circuits, data, database, data structures, tables, arrays, and variables. The functions provided by elements and units may be combined into those of a smaller number of elements and units or separated into those of a larger number of elements and units. In addition, the elements and units may be implemented to operate one or more central processing units (CPUs) within a device or a secure multimedia card. Also, in embodiments, the unit may include one or more processors.

Outgrowing what provides an initial voice-oriented service, a wireless communication system is evolving to a broadband wireless communication system that provides a high-speed and high-quality packet data service, like communication standards such as, for example, 3GPP high speed packet access (HSPA), long term evolution (LTE) (or evolved universal terrestrial radio access (E-UTRA)), LTE-advanced (LTE-A), high rate packet data (HRPD) of 3GPP2, ultra-mobile broadband (UMB), and 802.16e of IEEE. In addition, a 5G or new radio (NR) communication standard is being made as a 5G wireless communication system.

As a representative example of the broadband wireless communication system, an NR system employs an orthogonal frequency division multiplexing (OFDM) scheme in a downlink (DL) and an uplink (UL). Specifically, a cyclic-prefix OFDM (CP-OFDM) scheme is employed in the downlink, and a discrete Fourier transform spreading OFDM (DFT-S-OFDM) scheme is employed together with the CP-OFDM in the uplink. The uplink refers to a radio link in which a UE (user equipment (UE) or mobile station (MS)) transmits data or control signals to a base station (BS) (or gNode B), and the downlink refers to a radio link in which the base station transmits data or control signals to the UE. This multiple access scheme generally allocates and operates time-frequency resources for carrying data or control information to be not overlapped for each user (that is, orthogonality is established), so that each user's data or control information can be distinguished.

The NR system employs a hybrid automatic repeat request (HARQ) scheme for retransmitting corresponding data in a physical layer when a decoding failure occurs in the initial transmission. In the HARQ scheme, when failing to correctly decode data, a receiver sends information (negative acknowledgment: NACK) indicating a decoding failure to a transmitter so that the transmitter can retransmit the data in the physical layer. The receiver may improve data reception performance by combining data retransmitted by the transmitter with data that has previously failed to be decoded. In addition, when correctly decoding data, the receiver sends information (acknowledgement: ACK) indicating a decoding success to the transmitter so that the transmitter can transmit new data.

FIG. 1 is a diagram illustrating a basic structure of a time-frequency domain which is a radio resource domain in which the data or control channel is transmitted in downlink or uplink of an NR system.

In FIG. 1, the horizontal axis represents the time domain, and the vertical axis represents the frequency domain. The minimum transmission unit in the time domain is an OFDM symbol, and Nsymb OFDM symbols 1-02 constitute one slot 1-06. The length of a subframe is defined as 1.0 ms, and a radio frame 1-14 is defined as 10 ms. The minimum transmission unit in the frequency domain is a subcarrier, and the bandwidth of the entire system transmission bandwidth is composed of NBW subcarriers 1-04.

A basic unit of a resource in the time-frequency domain is a resource element (RE) 1-12, which may be represented with an OFDM symbol index and a subcarrier index. A resource block (RB) 1-08 or physical resource block (PRB) is defined as consecutive Nsymb OFDM symbols 1-02 in the time domain and consecutive NRB subcarriers 1-10 in the frequency domain. Therefore, one RB 1-08 is composed of Nsymb x NRB number of REs 1-12. In general, the minimum transmission unit of data is an RB unit.

In the NR system, Nsymb is 14, NRB is 12, and NBW and NRB are proportional to the bandwidth of the system transmission band. Also, the data rate may increase in proportion to the number of RBs scheduled for a UE. In the NR system, in case of the FDD system that divides downlink and uplink by frequency, a downlink transmission bandwidth and an uplink transmission bandwidth may be different from each other. A channel bandwidth represents an RF bandwidth corresponding to the system transmission bandwidth.

Table 1 shows the correspondence between the system transmission bandwidth and the channel bandwidth defined in the LTE system, which is the 4th generation wireless communication before the NR system. For example, the LTE system having a 10 MHz channel bandwidth may be configured with a transmission bandwidth of 50 RBs.

TABLE 1

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

The NR system may operate in a channel bandwidth wider than that of LTE shown in Table 1.

In the NR system, scheduling information for downlink data or uplink data is sent from a base station to a UE through downlink control information (DCI). The DCI is defined according to various formats, and each format may indicate whether it is scheduling information (UL grant) for uplink data or scheduling information (DL grant) for downlink data, whether it is a compact DCI with a small size of control information, whether spatial multiplexing using multiple antennas is applied, whether it is DCI for power control, and the like. For example, DCI format 1-1, which is scheduling control information (DL grant) for downlink data, may include at least one of the following types of control information.

Carrier indicator: This indicates a frequency carrier where transmission is performed.

DCI format indicator: This is an indicator for distinguishing whether the corresponding DCI is for downlink or uplink.

Bandwidth part (BWP) indicator: This indicates a BWP where transmission is performed.

Frequency domain resource allocation: This indicates an RB in the frequency domain allocated for data transmission. A resource to be expressed is determined according to the system bandwidth and the resource allocation scheme.

Time domain resource allocation: This indicates an OFDM symbol and a slot to be used for transmission of a data-related channel.

VRB-to-PRB mapping: This indicates a mapping scheme between a virtual RB (VRB) index and a physical RB (PRB) index.

Modulation and coding scheme (MCS): This indicates a modulation scheme and a coding rate used for data transmission. That is, this may indicate information about QPSK, 16 QAM, 64 QAM, or 256 QAM, and a coding rate value that informs a TBS and channel coding information.

Code block group (CBG) transmission information: This indicates information about a CBG transmitted when CBG retransmission is configured.

HARQ process number: This indicates the process number of HARQ.

New data indicator: This indicates whether HARQ initial transmission or retransmission.

Redundancy version: This indicates a redundancy version of HARQ.

Transmit power control (TPC) command for physical uplink control channel (PUCCH): This indicates a transmit power control command for PUCCH, which is an uplink control channel.

In case of PUSCH transmission, time domain resource assignment may be transmitted via information about a slot for PUSCH transmission, a start symbol position S in that slot, and the number of symbols L to which PUSCH is mapped. Here, S may be a relative position from the start of the slot, L may be the number of consecutive symbols, and S and L may be determined from a start and length indicator value (SLIV) defined as follows.

if $(L-1) \leq 7$ then $SLIV = 14 \cdot (L-1) + S$ else $SLIV = 14 \cdot (14-L+1) + (14-1-S)$ where $0 < L \leq 14-S$ In the NR system, generally through RRC configuration, information that includes, in one row, information about a SLIV value, a PUSCH mapping type, and a slot for PUSCH transmission may be configured. Such information may be configured, for example, in the form of a table. Then, in the time domain resource allocation of the DCI, an index value in the configured table is indicated so that a base station can transmit to a UE the information about a SLIV value, a PUSCH mapping type, and a slot for PUSCH transmission.

In the NR system, the PUSCH mapping type may be defined as type A and type B. In the PUSCH mapping type A, the first symbol among DMRS symbols is located in the second or third OFDM symbol in the slot. In the PUSCH mapping type B, the first symbol among DMRS symbols is located in the first OFDM symbol in the time domain resource allocated for PUSCH transmission.

The DCI may be transmitted on a physical downlink control channel (PDCCH) after a channel coding and modulation process. The DCI transmitted on the PDCCH is used interchangeably with control information. Also, a process in which the DCI is transmitted/received through the PDCCH may be expressed as that a PDCCH is transmitted/received.

In general, the DCI is scrambled with a specific radio network temporary identifier (RNTI) (or UE identifier) independently for each UE, adds a cyclic redundancy check (CRC), is channel-coded, is configured as each independent PDCCH, and is transmitted. The PDCCH is mapped and transmitted in a control resource set (CORESET) configured for the UE.

Downlink data may be transmitted on a physical downlink shared channel (PDSCH), which is a physical channel for downlink data transmission. The PDSCH may be transmitted after a control channel transmission section, and scheduling information such as a specific mapping position in the frequency domain and a modulation scheme is determined based on the DCI transmitted through the PDCCH.

Through the MCS among control information types constituting the DCI, a base station may notify a UE of a modulation scheme applied to the PDSCH to be transmitted and the size (transport block size, TBS) of data to be transmitted. In an embodiment, the MCS may consist of 5 bits or more or fewer bits. The TBS corresponds to the size before the channel coding for error correction is applied to data (transport block, TB) to be transmitted by a base station.

In the disclosure, the transport block (TB) may include a medium access control (MAC) header, a MAC control element (CE), one or more MAC service data units (SDUs), and padding bits. Alternatively, the TB may indicate a data unit or MAC protocol data unit (PDU) that is delivered from the MAC layer to the physical layer.

The modulation schemes supported in the NR system are quadrature phase shift keying (QPSK), 16 quadrature amplitude modulation (16 QAM), 64 QAM, and 256 QAM, and each modulation order (Qm) corresponds to 2, 4, 6, or 8. That is, 2 bits per symbol may be transmitted in case of QPSK modulation, 4 bits per symbol in case of 16 QAM modulation, 6 bits per symbol in case of 64 QAM modulation, and 8 bits per symbol in case of 256 QAM modulation.

Figure 2:
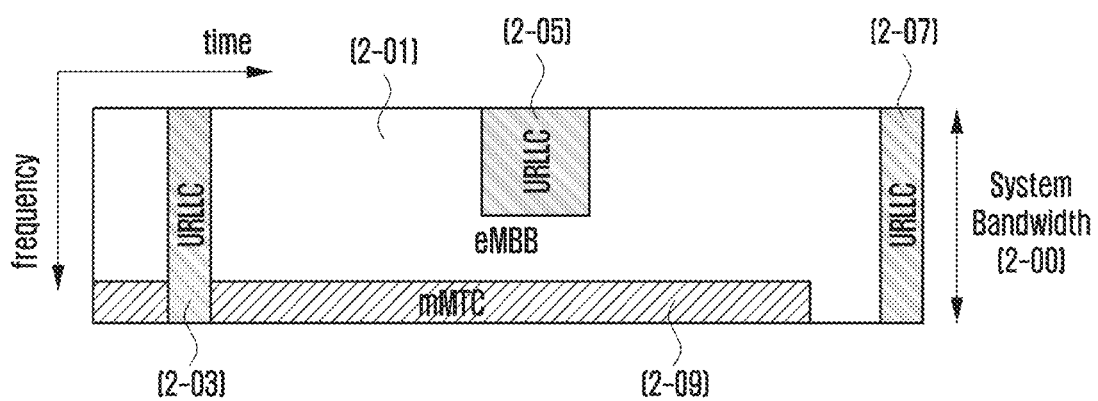
FIG. 2 is a diagram illustrating one example that data for eMBB, URLLC, and mMTC are allocated to frequency-time resources in a communication system.
Figure 3:
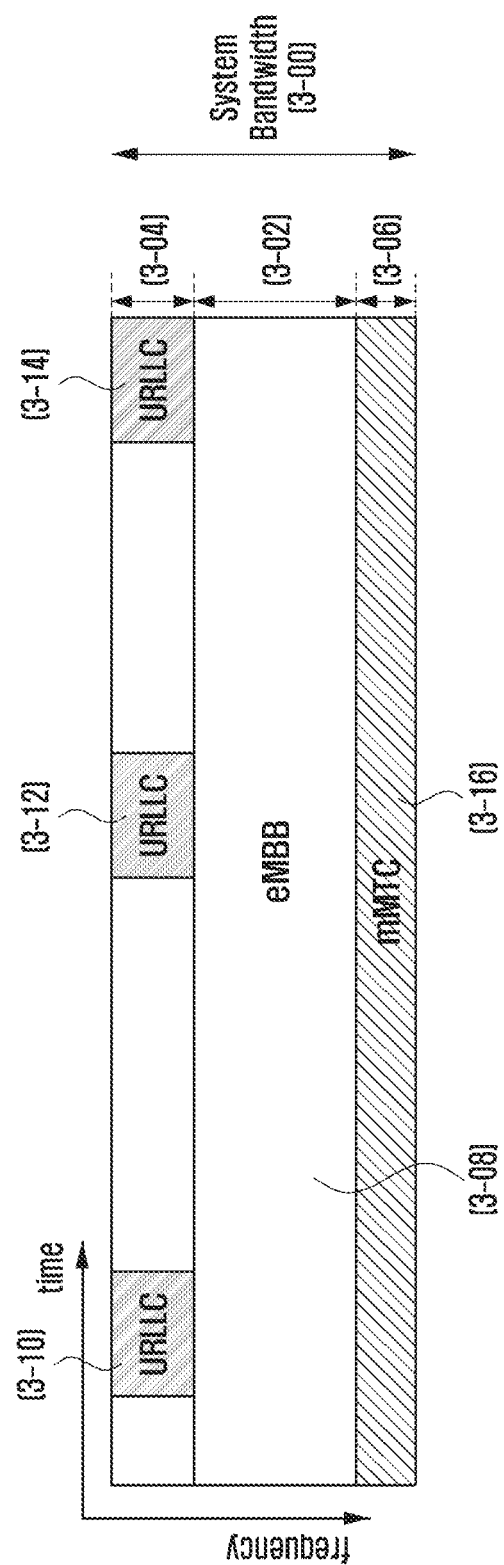
FIG. 3 is a diagram illustrating another example that data for eMBB, URLLC, and mMTC are allocated to frequency-time resources in a communication system.

FIGS. 2 and 3 are diagrams illustrating an example that data for eMBB, URLLC, and mMTC, which are services considered in a 5G or NR system, are allocated in frequency-time resources.

Referring to FIGS. 2 and 3, a scheme that frequency and time resources are allocated for information transmission in each system can be seen.

Referring to FIG. 2, in the entire system frequency band 2-00, data for eMBB, URLLC, and mMTC may be allocated. The eMBB data 2-01 and mMTC data 2-09 may be allocated and transmitted in a specific frequency band, and if URLLC data 2-03, 2-05, or 2-07 occurs and needs to be transmitted during the above data transmission, the URLLC data 2-03, 2-05, or 2-07 may be transmitted by emptying a part to which the eMBB data 2-01 and the mMTC data 2-09 have been already allocated, or not transmitting both data.

Because a URLLC service among the above-mentioned services needs to reduce a latency time, the URLLC data 2-03, 2-05, or 2-07 may be allocated to and transmitted in a part of resources to which the eMBB data 2-01 is allocated. Of course, in case that the URLLC data is additionally allocated to and transmitted in the resource to which the eMBB data is allocated, the eMBB data may not be transmitted in the overlapped frequency-time resource, and therefore the transmission performance of the eMBB data may be lowered. That is, in this case, a failure in the eMBB data transmission may occur due to the URLLC allocation.

Referring to FIG. 3, in respective sub-bands 3-02, 3-04, and 3-06 divided from the entire system frequency band 3-00, services and data may be transmitted. Information related to such sub-band configuration may be predetermined, and this information may be transmitted from a base station to a UE through higher level signaling. Alternatively, the information related to the sub-bands may be arbitrarily divided by a base station or a network node, and services may be provided to a UE without separate transmission of sub-band configuration information. In FIG. 3, it is shown that the sub-band 3-02 is used for transmission of eMBB data 3-08, the sub-band 3-04 is used for transmission of URLLC data 3-10, 3-12, or 3-14, and the sub-band 3-06 is used for transmission of mMTC data 3-16.

Throughout embodiments, a length of a transmission time interval (TTI) used for URLLC transmission may be shorter than a TTI length used for eMBB or mMTC transmission. In addition, a response of information related to URLLC may be transmitted faster than eMBB or mMTC, and thus information may be transmitted and received with low latency. Structures of physical layer channels used for respective types to transmit the above-described three services or data may be different. For example, at least one of a length of a TTI, an allocation unit of a frequency resource, a structure of a control channel, and a data mapping method may be different.

Although three types of services and three types of data have been described above, more types of services and corresponding data may exist, and even in this case, the contents of the disclosure may also be applied.

The terms physical channel and signal in the NR system may be used to describe the method and device proposed in embodiments. However, the contents of the disclosure may be applied not only to the NR system but also to other wireless communication systems.

Figure 4:
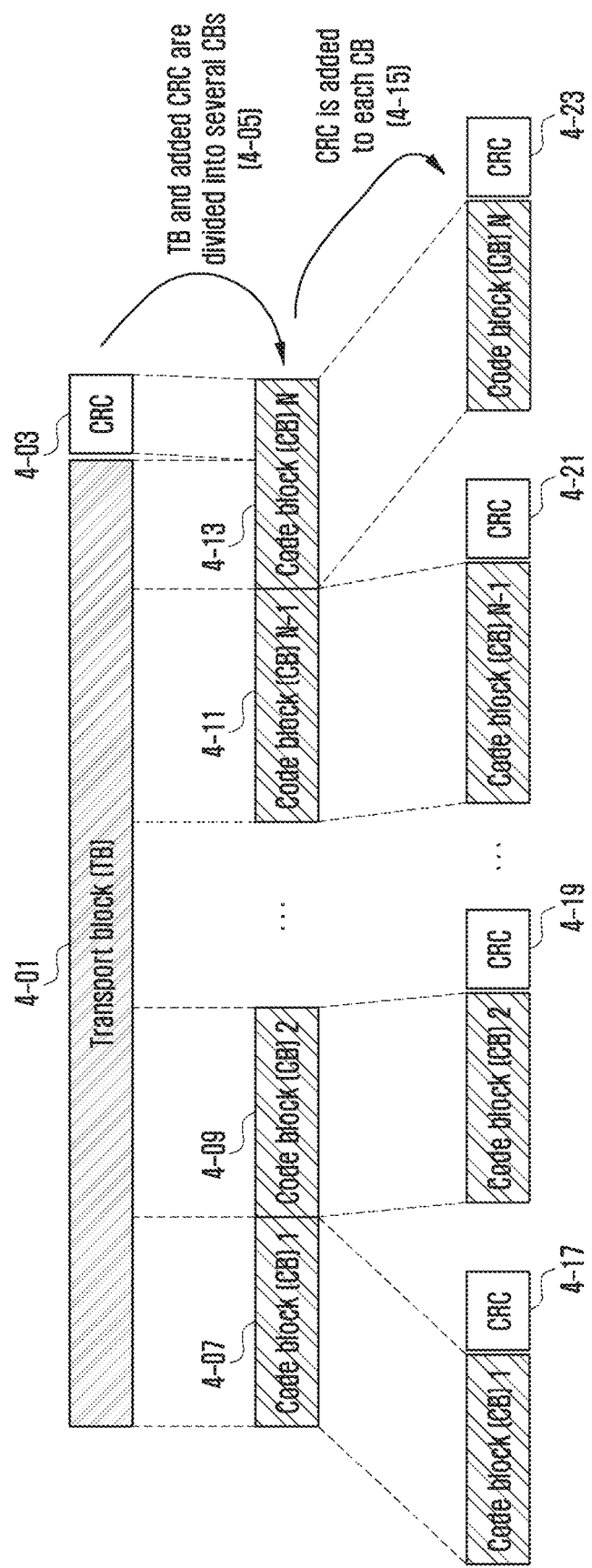
FIG. 4 is a diagram illustrating a structure in which one transport block is divided into several code blocks and a CRC is added.

FIG. 4 is a diagram illustrating a process in which one transport block is divided into several code blocks and a CRC is added.

Referring to FIG. 4, a CRC 4-03 may be added to the last or front part of one transport block (TB) 4-01 to be transmitted in uplink or downlink. The CRC 4-03 may have 16 bits, 24 bits, a predetermined number of bits, or a variable number of bits depending on a channel condition, and may be used to determine whether or not channel coding is successful.

The TB 4-01 and a block of the added CRC 4-03 may be divided 4-05 into several code blocks (CBs) 4-07, 4-09, 4-11, and 4-13. Here, the maximum size of the code block may be determined in advance, and in this case, the last code block 4-13 may have a smaller size than the other code blocks, or may have 0, a random value, or 1 inserted therein to match the length with the other code blocks. CRCs 4-17, 4-19, 4-21, and 4-23 may be added 4-15 to the above code blocks, respectively. The CRC may have 16 bits, 24 bits, or a predetermined number of bits, and may be used to determine whether channel coding succeeds.

The TB 4-01 and a cyclic generator polynomial may be used to generate the CRC 4-03, and the cyclic generator polynomial may be defined in various manners. For example, assuming that the cyclic generator polynomial for 24-bit CRC is gCRC24A(D)=D24+D23+D18+D17+D14+D11+D10+D7+D6+D5+D4+D3+D+1, and that L is 24, the CRC $p_0$, $p_1$, $p_2$, $p_3$, . . . , $p_{L-1}$ for TB data $a_0$, $a_1$, $a_2$, $a_3$, . . . , $a_{A-1}$ may be determined as a value that when dividing $a_0 D^{A+23} + a_1 D^{A+22} + \ldots + a_{A-1} D^{24} + p_0 D^{23} + p_1 D^{22} + \ldots + p_{22} D^1 + p_{23}$ by gCRC24A(D), the remainder becomes zero.

Although a case that the CRC length L is 24 has been described above, the CRC length L may be determined to have various lengths such as 12, 16, 24, 32, 40, 48, 64, and the like. After the CRC is added to the TB through this process, it can be divided into N CBs 4-07, 4-09, 4-11, and 4-13. The CRCs 4-17, 4-19, 4-21, and 4-23 may be added 4-15 to the CBs 4-07, 4-09, 4-11, and 4-13, respectively. The CRC added to the CB may have a length different from that of the CRC added to the TB, or may use a different cyclic generator polynomial. However, the CRC 4-03 added to the TB and the CRCs 4-17, 4-19, 4-21, and 4-23 added to the code blocks may be omitted depending on the type of channel code to be applied to the code block. For example, when an LDPC code, not a turbo code, is applied to the code block, the CRCs 4-17, 4-19, 4-21, and 4-23 to be inserted for the respective code blocks may be omitted. However, even when LDPC is applied, the CRCs 4-17, 4-19, 4-21, and 4-23 may be still added to the code blocks. Also, even when a polar code is used, such a CRC may be added or omitted.

As shown in FIG. 4, for the TB to be transmitted, the maximum length of one code block is determined depending on the type of channel coding applied, and the TB and the CRC added to the TB are divided into code blocks in accordance with the maximum length of the code block. In the conventional LTE system, a CRC for a CB is added to a divided CB. A data bit of the CB and the CRC are encoded with channel code, thereby coded bits are determined, and as promised in advance, the number of bits for rate matching is determined for the respective coded bits.

Figure 5:
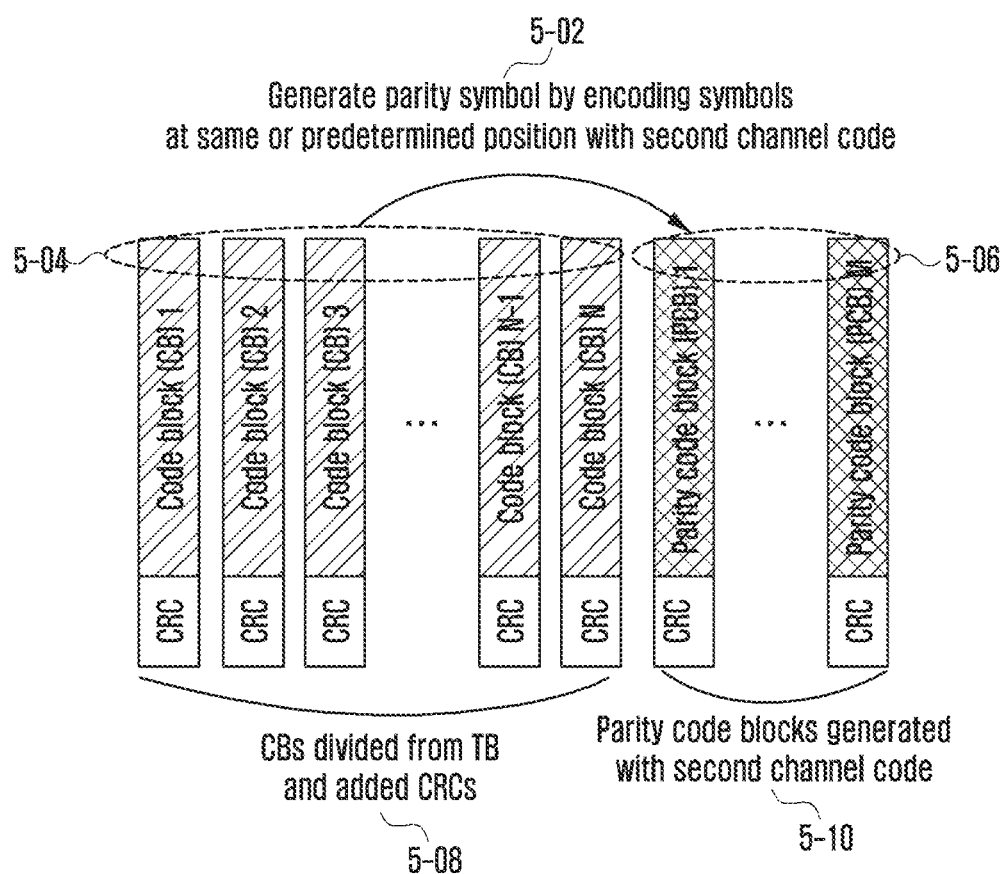
FIG. 5 is a diagram illustrating a structure in which an outer code is applied and coded.
Figure 6:
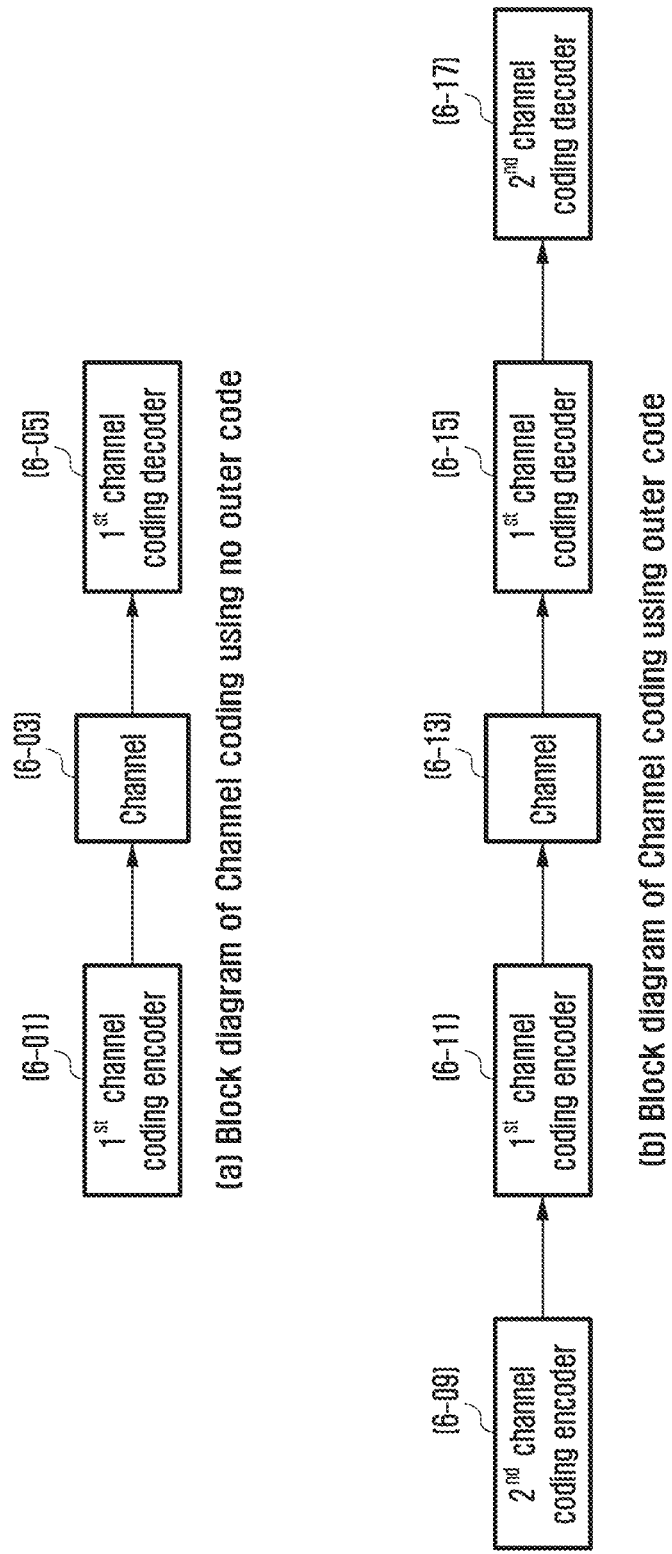
FIG. 6 is a block diagram illustrating a structure depending on whether an outer code is applied.

FIG. 5 is a diagram illustrating a scheme that an outer code is used and transmitted, and FIG. 6 is a block diagram illustrating a structure of a communication system using the outer code.

Referring to FIGS. 5 and 6, a method of transmitting a signal by using an outer code will be described.

In FIG. 5, after one transport block is divided into several code blocks, bits or symbols 5-04 located at the same position in each code block are encoded with the second channel code to generate 5-02 parity bits or symbols 5-06. After that, CRCs 5-08 and 5-10 may be added to the code blocks and the parity code blocks generated by the second channel code encoding.

Whether to add the CRC may be varied depending on the type of the channel code. For example, the CRCs 5-08 and 5-10 are added in case where the turbo code is used as the first channel code, and then the respective code blocks and parity code blocks may be encoded through the first channel code encoding. In the disclosure, as the first channel code, a convolutional code, an LDPC code, a turbo code, a polar code, etc. may be used. However, this is only exemplary, and various channel codes may be applied to the disclosure.

In the disclosure, as the second channel code, a Reed-Solomon code, a BCH code, a raptor code, a parity bit generation code, and the like may be used for example. However, this is only exemplary, and various channel codes may be applied to the disclosure as the second channel code.

Referring to (b) of FIG. 6, when the outer code is used, data to be transmitted passes through a second channel coding encoder 6-09. Bits or symbols that have passed through the second channel coding encoder 6-09 passes through a first channel coding encoder 6-11. When channel-coded symbols arrive at a receiver through a channel 6-13, the receiver may sequentially operate a first channel coding decoder 6-15 and a second channel coding decoder 6-17, based on received signals. The first channel coding decoder 6-15 and the second channel coding decoder 6-17 may perform operations corresponding to the first channel coding encoder 6-11 and the second channel coding encoder 6-09, respectively.

On the other hand, referring to (a) of FIG. 6, when the outer code is not used, only both a first channel coding encoder 6-01 and a first channel coding decoder 6-05 are used in a transceiver, and both a second channel coding encoder and a second channel coding decoder are not be used. Even when the outer code is not used, the first channel coding encoder 6-01 and the first channel coding decoder 6-05 may be configured in the same way as when the outer code is used.

Figure 7:
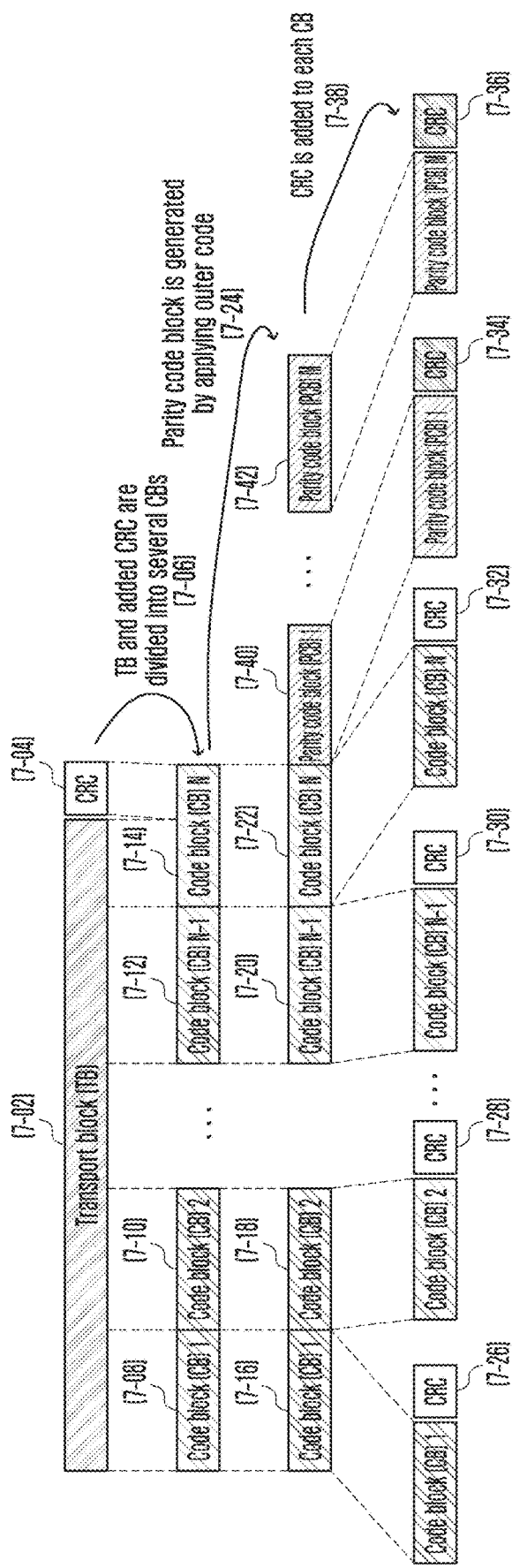
FIG. 7 is a diagram illustrating a structure in which one transport block is divided into several code blocks, an outer code is applied, and thereby a parity code block is generated.

FIG. 7 is a diagram illustrating a structure in which one transport block is divided into several code blocks, an outer code is applied, and thereby a parity code block is generated.

FIG. 7 is a diagram illustrating an example that one or more parity code blocks are generated by applying a second channel code or an outer code after one transport block is divided into several code blocks. As in FIG. 4 above, one transport block may be divided into one or more code blocks. At this time, if only one code block is generated according to the size of the transport block, the CRC may not be added to the code block.

When the outer code is applied to the code blocks to be transmitted, parity code blocks 7-40 and 7-42 are generated 7-24. When the outer code is used, the parity code blocks may be located 7-24 after the last code block. After the outer code is applied, CRCs 7-26, 7-28, 7-30, 7-32, 7-34, and 7-36 are added 7-38. Then, together with the CRCs, the respective code blocks and parity code blocks may be encoded using a channel code.

Hereinafter, in the disclosure, an uplink scheduling grant signal and a downlink data signal are referred to as a first signal. Also, in the disclosure, an uplink data signal for uplink scheduling grant and HARQ ACK/NACK for a downlink data signal are referred to as a second signal. That is, in the disclosure, among signals transmitted to a UE by a base station, a signal expecting a response from the UE may be the first signal, and a response signal of the UE in response to the first signal may be the second signal. However, the first and second signals in the disclosure are not limited to the above signals, and the first and second signals may be used to distinguish different signals.

Also, in the disclosure, a service type of the first signal may belong to a category such as eMBB, mMTC, and URLLC.

Hereinafter, in the disclosure, a TTI length of the first signal refers to the length of time during which the first signal is transmitted. Also, in the disclosure, a TTI length of the second signal refers to the length of time the second signal is transmitted. Additionally, in the disclosure, a second signal transmission timing is information on a time point (or timing) at which a UE transmits the second signal and a base station receives the second signal, and may be referred to as a second signal transmission/reception timing.

Because the UE is generally far from the base station, the base station may receive the signal transmitted from the UE after a propagation delay time. The propagation delay time may be determined as a value obtained by dividing a path through which radio waves are transmitted from the UE to the base station by the speed of light, and in general, may also be determined as a value obtained by dividing a distance from the UE to the base station by the speed of light. For example, in case of the UE located 100 km away from the base station, a signal transmitted from the UE may be received by the base station after about 0.34 msec. Conversely, a signal transmitted from the base station may be received by the UE after about 0.34 msec. As such, the arrival time of a signal transmitted from the UE to the base station may vary according to the distance between the UE and the base station. Therefore, when multiple UEs located in different locations transmit signals at the same time, arrival times at the base station may all be different. In order to solve this phenomenon and allow signals transmitted from multiple UEs to arrive at the base station at the same time, the transmission time may be slightly different for respective UEs according to their locations, which is called timing advance in the NR and LTE systems.

Figure 8:
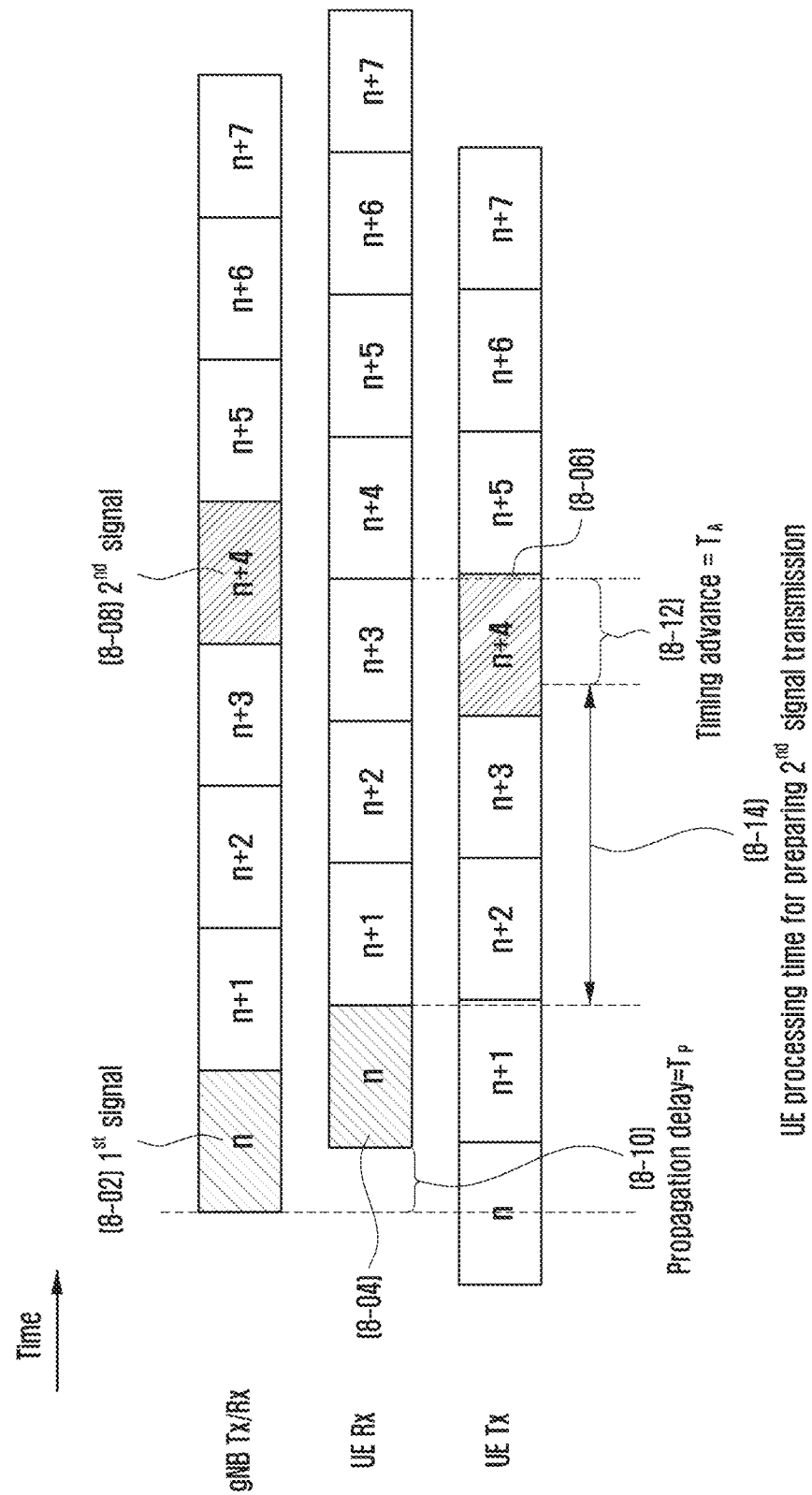
FIG. 8 is a diagram illustrating a processing time of a UE based on timing advance according to a distance between the UE and a base station when the UE receives a first signal and transmits responsively a second signal in an NR system.

FIG. 8 is a diagram illustrating a processing time of a UE based on timing advance according to a distance between the UE and a base station (gNB) when the UE receives a first signal and transmits responsively a second signal in an NR system. When the base station transmits an uplink scheduling grant or downlink control signal and data to the UE in slot n 8-02, the UE may receive the uplink scheduling grant or downlink control signal and data in slot n 8-04. In this case, the reception time of the UE may be later than the transmission time of the base station by the propagation delay time TP 8-10.

In this example, when the UE receives the first signal in slot n, the UE transmits the corresponding second signal in slot n+4 406. Even in case that the UE transmits a signal to the base station, in order to allow the signal to arrive at the base station at a specific time, the UE may transmit uplink data or HARQ ACK/NACK for downlink data at a timing 8-06 that is advanced by TA 8-12 from the slot n+4 of the received signal reference. Therefore, in this example, the time during which the UE can prepare to transmit uplink data after receiving uplink scheduling grant or prepare to deliver HARQ ACK or NACK after receiving downlink data becomes a time 8-14 corresponding to three slots minus TA.

To determine the timing, the base station may calculate the absolute value of the TA of the corresponding UE. The base station can calculate the absolute value of the TA while adding or subtracting the amount of change in the TA value transmitted through higher signaling to or from the TA value first delivered to the UE at the random access step in the initial access of the UE. In the disclosure, the absolute value of the TA may be a value obtained by subtracting the start time of the nth TTI received by the UE from the start time of the nth TTI transmitted by the UE.

Meanwhile, one of important criteria for the performance of a cellular wireless communication system is packet data latency. To this end, in the LTE system, signal transmission and reception is performed in units of a subframe having a transmission time interval (TTI) of 1 ms. In the LTE system that operates as described above, it is possible to support a UE (short-TTI UE) having a TTI shorter than 1 ms.

Meanwhile, in NR which is the 5th generation mobile communication system, the TTI may be shorter than 1 ms. The short-TTI UE is expected to be suitable for services such as a Voice over LTE (VoLTE) service and a remote control where latency is important. In addition, the short-TTI UE is expected as a means capable of realizing the cellular-based, mission-critical Internet of things (IoT).

In the NR system, when the base station transmits a PDSCH including downlink data, the base station may indicate, in DCI scheduling the PDSCH, a K1 value corresponding to timing information for the UE to transmit HARQ-ACK information of the PDSCH. The HARQ-ACK information may be transmitted by the UE to the base station when it is not instructed to be transmitted before a symbol L1 by including the timing advance. That is, the HARQ-ACK information may be transmitted from the UE to the base station at the same or later time than the symbol L1 by including the timing advance.

If the HARQ-ACK information is indicated to be transmitted before the symbol L1 by including the timing advance, the HARQ-ACK information transmitted by the UE to the base station may not be valid HARQ-ACK information. The symbol L1 may indicate a first symbol where a cyclic prefix (CP) starts after Tproc,1 from the last time point of the PDSCH. The Tproc,1 may be calculated as in Equation 1 below.

$$T_{proc,1} = ((N_1 + d_{1,1} + d_{1,2})(2048 + 144) \cdot \kappa 2^{-\mu}) \cdot T_c \qquad \text{Equation 1}$$

In the above Equation, N1, d1,1, d1,2, κ, μ, and TC may be defined as follows.

When the HARQ-ACK information is transmitted through a PUCCH (uplink control channel), d1,1 is 0, and when transmitted through a PUSCH (uplink shared channel, data channel), d1,1 is 1.

If the UE is configured with a plurality of activated configuration carriers or carriers, the maximum timing difference between carriers should be reflected in the second signal transmission.

In case of PDSCH mapping type A, that is, in case that the position of the first DMRS symbol is the third or fourth symbol of the slot, if the position index i of the last symbol of the PDSCH is less than 7, d1,2 is defined as 7-i.

In case of PDSCH mapping type B, that is, in case that the position of the first DMRS symbol is the first symbol of the PDSCH, if the length of the PDSCH is 4 symbols, d1,2 is 3, and if the length of the PDSCH is 2 symbols, d1,2 is 3+d, where d is the number of symbols in which the PDSCH and the PDCCH including the control signal for scheduling the corresponding PDSCH overlap.

N1 is defined as in the following table according to μ. Here, μ=0, 1, 2, and 3 refer to subcarrier spacing of 15 kHz, 30 kHz, 60 kHz, and 120 kHz, respectively.

| | PDSCH decoding time N₁ [symbols] | |
| --- | --- | --- |
| μ | No additional PDSCH DM-RS configured | Additional PDSCH DM-RS configured |
| 0 | 8 | 13 |
| 1 | 10 | 13 |
| 2 | 17 | 20 |
| 3 | 20 | 24 |

The N1 values provided in the above table may vary according to UE capability.

It can be defined as $T_c=1/(\Delta f_{max} \cdot N_f)$, $\Delta f_{max}=480 \cdot 10^3$ Hz, $N_f=4096$, $\kappa=T_s/T_c=64$, $T_s=1/(\Delta f_{ref} \cdot N_{f,ref})$, $\Delta f_{rev}=15 \cdot 10^3$ Hz, and $N_{f,ref}=2048$.

In addition, in the NR system, when the base station transmits control information including uplink scheduling grant, the base station may indicate, using the control information, a K2 value corresponding to timing information for the UE to transmit uplink data or PUSCH. The PUSCH may be transmitted by the UE to the base station when it is not instructed to be transmitted before a symbol L2 by including the timing advance. That is, the PUSCH may be transmitted from the UE to the base station at the same or later time than the symbol L2 by including the timing advance.

If the PUSCH is indicated to be transmitted before the symbol L2 by including the timing advance, the UE may ignore the uplink scheduling grant control information from the base station. The symbol L2 may indicate a first symbol where a cyclic prefix (CP) starts after Tproc,2 from the last time point of the PDCCH including the scheduling grant. The Tproc,2 may be calculated as in Equation 2 below.

$$T_{proc,2}=((N_2+d_{2,1})(2048+144) \cdot \kappa 2^{-\mu}) \cdot T_c \quad \text{Equation 2}$$

In the above Equation, N2, d2,1, κ, μ, and TC may be defined as follows.

If the first symbol among PUSCH-allocated symbols includes only DMRS, d2,1 is 0, otherwise d2,1 is 1.

If the UE is configured with a plurality of activated configuration carriers or carriers, the maximum timing difference between carriers should be reflected in the second signal transmission.

N2 is defined as in the following table according to μ. Here, μ=0, 1, 2, and 3 refer to subcarrier spacing of 15 kHz, 30 kHz, 60 kHz, and 120 kHz, respectively.

| μ | PUSCH preparation time N₂ [symbols] |
| --- | --- |
| 0 | 10 |
| 1 | 12 |
| 2 | 23 |
| 3 | 36 |

The N2 values provided in the above table may vary according to UE capability.

It can be defined as $T_c=1/(\Delta f_{max} \cdot N_f)$, $\Delta f_{max}=480 \cdot 10^3$ Hz, $N_f=4096$, $\kappa=T_s/T_c=64$, $T_s=1/(\Delta f_{ref} \cdot N_{f,ref})$, $\Delta f_{rev}=15 \cdot 10^3$ Hz, and $N_{f,ref}=2048$.

Meanwhile, the NR system may configure a bandwidth part (BWP) in one carrier to enable a specific UE to transmit/receive a signal within the configured BWP. This may be aimed at reducing power consumption of the UE. The base station may configure a plurality of BWPs, and may change an activated BWP in control information. The time for the BWP to be changed may be defined as shown in Table 2 below.

TABLE 2

| Frequency Range | Scenario | Type 1 Delay (us) | Type 2 Delay (us) |
| --- | --- | --- | --- |
| 1 | 1 | 600 | 2000 |
| | 2 | 600 | 2000 |
| | 3 | 600 | 2000 |
| | 4 | 400 | 950 |
| 2 | 1 | 600 | 2000 |
| | 2 | 600 | 2000 |
| | 3 | 600 | 2000 |
| | 4 | 400 | 950 |

In the above table, Frequency Range 1 refers to a frequency band of 6 GHz or less, and Frequency Range 1 refers to a frequency band of 6 GHz or more. In the above, Type 1 and Type 2 may be determined according to UE capability. In the above, Scenarios 1, 2, 3 and 4 may be determined as shown in the following table.

| | Center Frequency Changeable | Center Frequency Unchangeable |
| --- | --- | --- |
| Frequency Bandwidth Changeable | Scenario 3 | Scenario 2 |
| Frequency Bandwidth Unchangeable | Scenario 1 | Scenario 4 when subcarrier spacing is changed |

Hereinafter, in the disclosure, when a BWP change request is included in control information or a BWP change is triggered, it may mean that BWP information indicated by a BWP indicator included in the control information indicates a BWP different from the currently activated BWP and thereby the BWP is changed. Conversely, if the same BWP as the currently active BWP is indicated, it may be considered that there is no BWP change request.

In the following embodiments, a method and device for transmitting/receiving data between a base station and a UE or between UEs are provided. This may be a case that data is transmitted from one UE to a plurality of UEs, or may be a case that data is transmitted from one UE to a single UE. Alternatively, it may be a case that data is transmitted from a base station to a plurality of UEs. However, the disclosure may be applied to various cases without being limited to the above cases.

Figure 9:
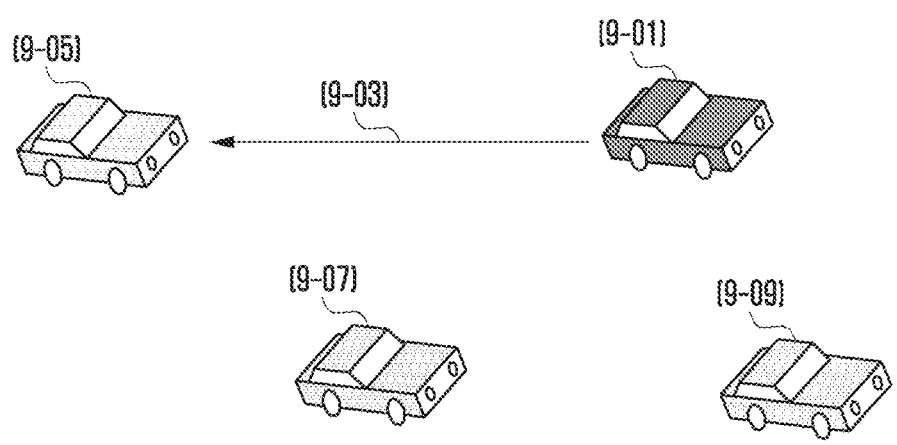
FIG. 9 is a diagram illustrating an example that one-to-one communication, i.e., unicast communication, is performed between two UEs through a sidelink according to the disclosure.

FIG. 9 is a diagram illustrating an example that one-to-one communication, i.e., unicast communication, is performed between two UEs through a sidelink according to the disclosure.

FIG. 9 shows an example that a signal is transmitted from a first UE 9-01 to a second UE 9-05, and the direction of signal transmission may be reversed. That is, a signal may be transmitted from the second UE 9-05 to the first UE 9-01.

Excepting the first and second UEs 9-01 and 9-05, the other UEs 9-07 and 9-09 cannot receive signals transmitted/received through unicast between the first and second UEs 9-01 and 9-05. Transmission/reception of signals through unicast between the first and second UEs 9-01 and 9-05 may be mapped in a resource promised between the first and second UEs 9-01 and 9-05, or made through processes of scrambling using mutually agreed values, control information mapping, data transmission using mutually configured values, mutually checking unique ID values, and the like. The UE may be a moving UE such as a vehicle. For signal transmission/reception through the unicast, separate transmission of control information, physical control channel, and data may be performed.

Figure 10:
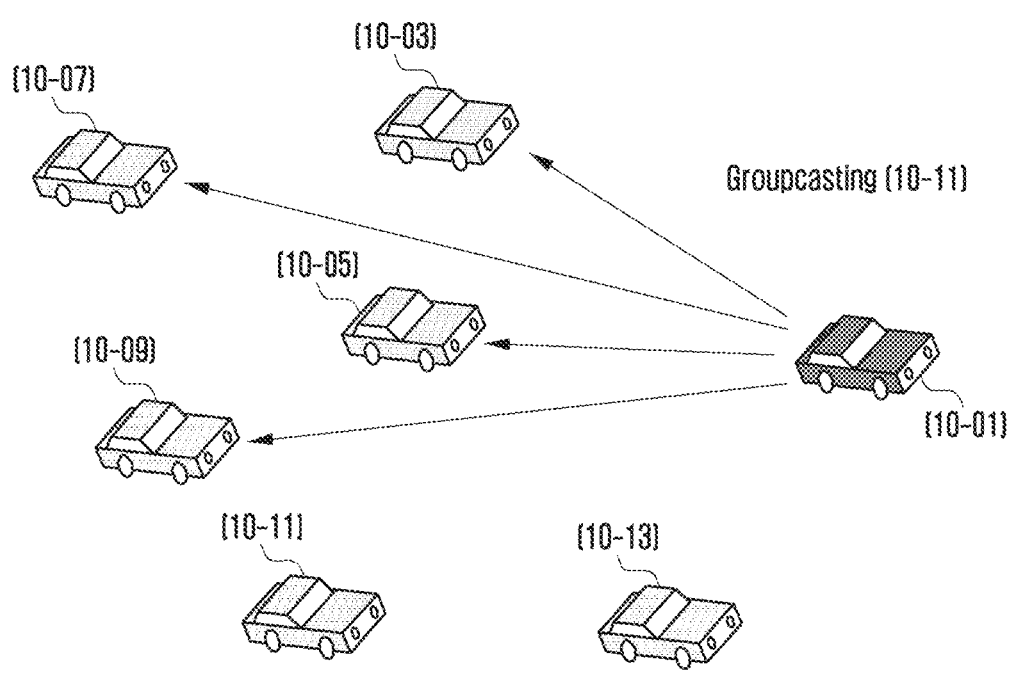
FIG. 10 is a diagram illustrating an example of groupcast communication that one UE transmits common data to a plurality of UEs through a sidelink according to the disclosure.

FIG. 10 is a diagram illustrating an example of groupcast communication that one UE transmits common data to a plurality of UEs through a sidelink according to the disclosure.

FIG. 10 shows an example that a first UE 10-01 transmits a signal to other UEs 10-03, 10-05, 10-07, and 10-09 in a group, and UEs 10-11 and 10-13 which are not included in the group may not receive signals transmitted for groupcast.

The UE transmitting a signal for the groupcast may be any other UE in the group, and resource allocation for signal transmission may be provided by a base station, provided by a leader UE in the group, or selected by the signal-transmitting UE by itself. The UE may be a moving UE such as a vehicle. For signal transmission/reception through the unicast, separate transmission of control information, physical control channel, and data may be performed.

Figure 11:
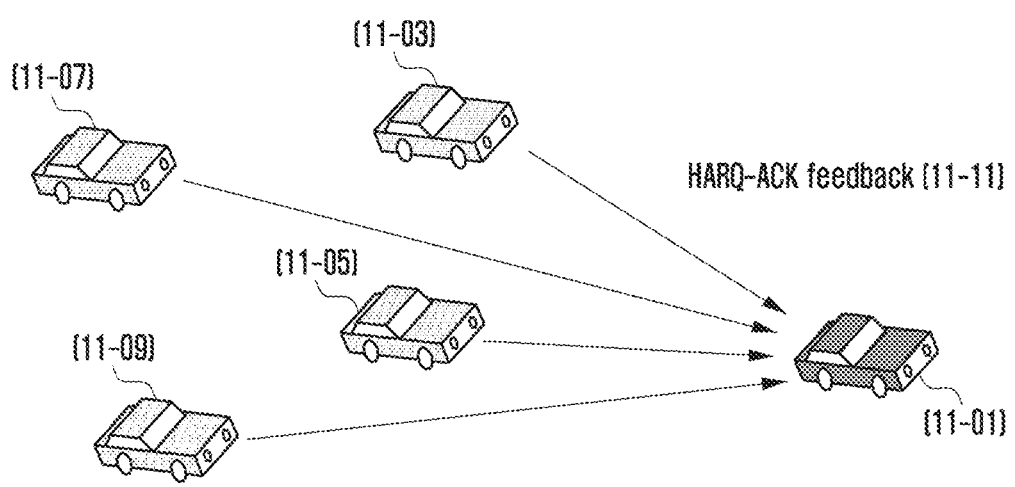
FIG. 11 is a diagram illustrating a process in which UEs receiving common data through groupcast communication transmit information related to success or failure of data reception to a UE that has transmitted data according to the disclosure.

FIG. 11 is a diagram illustrating a process in which UEs receiving common data through groupcast communication transmit information related to success or failure of data reception to a UE that has transmitted data according to the disclosure.

UEs that have received common data through groupcast may transmit, to a UE 11-01, information related to success or failure of data reception. This information may be information such as HARQ-ACK feedback 11-11. The UEs may be UEs having an LTE-based or NR-based sidelink function. The UE having only the LTE-based sidelink function may not be able to transmit/receive an NR-based sidelink signal and a physical channel. In the disclosure, the sidelink may be used interchangeably with PC5, V2X, or D2D.

Although an example of transmission/reception according to groupcasting is illustrated in FIGS. 10 and 11, this may also be applied to unicast signal transmission/reception between UEs.

In the disclosure, a sidelink control channel may be referred to as a physical sidelink control channel (PSCCH), and a sidelink shared channel or data channel may be referred to as a physical sidelink shared channel (PSSCH). In addition, a broadcast channel broadcasted together with a synchronization signal may be referred to as a physical sidelink broadcast channel (PSBCH), and a channel for feedback transmission may be referred to as a physical sidelink feedback channel (PSFCH). However, for feedback transmission, the PSCCH or the PSSCH may be used. Depending on a transmission-side communication system, it may be referred to as LTE-PSCCH, LTE-PSSCH, NR-PSCCH, NR-PSSCH, and the like. In the disclosure, a sidelink may refer to a link between UEs, and a Uu link may refer to a link between a base station and a UE.

Hereinafter, embodiments of the disclosure will be described in detail with reference to the accompanying drawings. In addition, if it is determined that a detailed description of a related function or configuration unnecessarily obscures the subject matter of the disclosure, the detailed description will be omitted. Further, the terms used herein are terms defined in consideration of functions in the disclosure, and may vary according to a user's or operator's intention or customs. Therefore, the definition should be made based on the content throughout the disclosure. In the disclosure, a base station refers to an entity performing resource allocation of a UE, and may be at least one of a gNode B (gNB), an eNode B (eNB), a Node B, a base station (BS), a radio access unit, a base station controller, or a node on a network. In the disclosure, a terminal may include a user equipment (UE), a mobile station (MS), a cellular phone, a smart phone, a computer, or a multimedia system capable of performing a communication function. In the disclosure, a downlink (DL) is a wireless transmission path of a signal transmitted from a base station to a UE, and an uplink (UL) is a wireless transmission path of a signal transmitted from a UE to a base station. Although embodiments of the disclosure will be described below using an NR system as an example, such embodiments may also be applied to other communication systems having a similar technical background or channel type. In addition, the embodiments of the disclosure may be applied to other communication systems through some modifications within a range that does not significantly depart from the scope of the disclosure as will be apparent to a person skilled in the art.

In the disclosure, the terms of a physical channel and a signal may be used interchangeably with data or a control signal. For example, PDSCH is a physical channel through which data is transmitted in sidelink, but the PDSCH may be referred to as data in the disclosure.

In the disclosure, higher signaling is a signal transmission method from a base station to a UE using a downlink data channel of a physical layer or from a UE to a base station using an uplink data channel of a physical layer, and may also be referred to as RRC signaling or a MAC control element (CE).

First Embodiment

The first embodiment provides a method for configuring a BWP and a resource pool, which are configured for a UE to perform sidelink communication, and a control resource set (CORESET) and a search space for transmission of control information. In this method, the UE may receive configuration information from a base station, or from another UE through a sidelink, or the configuration information may be preconfigured. The search space and the CORESET may be resources used for mapping and transmitting sidelink control information or a physical sidelink control channel (PSCCH).

First, the UE may receive configuration of a BWP for sidelink communication in one carrier being transmitted and received for sidelink communication.

In addition, the UE may receive configuration of a resource pool within the configured BWP. The resource pool may be a resource pool for sidelink transmission, a resource pool for sidelink reception, or a resource pool for sidelink transmission and reception. In this case, the configuration information for the resource pool may include n_PRBstartRP, which is the lowest PRB index of the resource pool. In addition, the lowest PRB index of the resource pool may be delivered using an offset value based on the smallest PRB in the BWP to which the resource pool belongs. That is, n_PRBstartRP, which is the lowest PRB index of the resource pool, may mean the n_PRBstartRP-th PRB from the smallest PRB of the corresponding BWP. In case of using this method, a reference point in allocating a frequency resource of the resource pool may be the lowest PRB number of the corresponding BWP.

Figure 12:
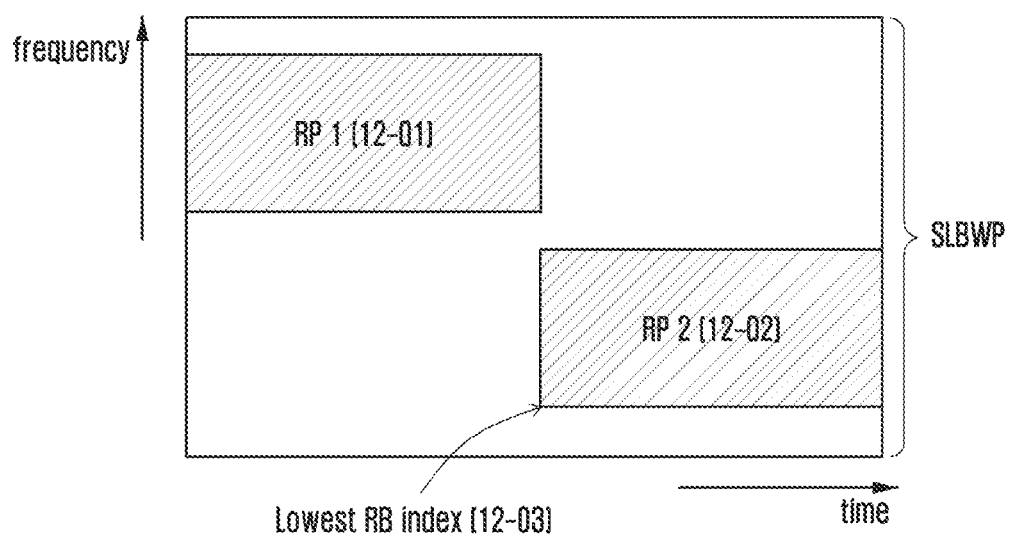
FIG. 12 is a diagram illustrating an example of a BWP configured for sidelink communication and a resource pool configured in the BWP according to an embodiment of the disclosure.

FIG. 12 is a diagram illustrating an example of a BWP configured for sidelink communication and a resource pool configured in the BWP according to an embodiment of the disclosure.

The RBs included in the resource pool may be assigned indices 0, 1, 2, 3 . . . NRP-1 from the RB located in the lowest frequency band. In the above, NRP is the number of RBs corresponding to the resource pool. For example, RB 0 in a resource pool 2 (RP2) 12-02, that is, the RB 12-03 having the lowest RB index in the resource pool 2, may be configured via offset information determined based on the PRB corresponding to the lowest PRB number in the BWP.

Second Embodiment

The second embodiment provides, when a UE capable of performing uplink and downlink data transmission/reception by accessing a base station wants to communicate with another UE through a sidelink, a method and device for operation according to configuration of a BWP for signal transmission and reception in Uu, which is a link between the base station and the UE, and a BWP for sidelink transmission and reception.

The UE may receive configuration of a BWP for a downlink to receive a downlink signal from the base station, and may also receive configuration of a BWP for an uplink to transmit an uplink signal to the base station. Such configurations may be transmitted from the corresponding base station to the UE through higher level signaling. In addition, for communication between UEs, the UE may receive configuration for a sidelink BWP via higher-level signaling when accessing the base station or via higher-level signaling between UEs through communication between UEs, or the UE may store in advance the configuration for the sidelink BWP.

This embodiment provides the operation of the UE according to each BWP configuration when the downlink or uplink with the base station and the sidelink between the UEs are performed in the same frequency domain or the same carrier. In this embodiment, the downlink or uplink BWP may be referred to as U-BWP, and the sidelink BWP may be referred to as SL-BWP. The sidelink BWP may be a sidelink transmit BWP or a sidelink receive BWP. Although the downlink BWP and the uplink BWP may be different from each other in actual operation of the base station, this embodiment will be described on the assumption that the downlink BWP and the uplink BWP are the same. However, the disclosure is not limited thereto, and may also be applied to the other case that the downlink BWP and the uplink BWP are different.

Case 1: A UE operation is provided when the U-BWP and the SL-BWP partially or completely overlap in the frequency domain. If the UE is configured for the U-BWP and the SL-BWP to overlap, in the frequency domain where the U-BWP and the SL-BWP overlap, the U-BWP and the SL-BWP overlap, the UE may perform transmission/reception operation for the U-BWP, i.e., transmission/reception with the base station, and may not perform, i.e., omit, transmission/reception operation for the SL-BWP, i.e., transmission/reception between UEs.

Meanwhile, in a frequency domain that does not overlap with the U-BWP among the frequency domains of the SL-BWP, the UE may perform the operation for the SL-BWP, that is, the transmission/reception operation between UEs. The operation for the SL-BWP may include reception and decoding of sidelink control information, identification of sidelink frequency domain or channel occupation, reception and decoding of sidelink data, transmission of sidelink control information and data, and the like. This may mean not performing the operation of the SL-BWP so as to perform transmission or reception of the U-BWP.

Case 1-1: Another UE operation is provided when the U-BWP and the SL-BWP partially or completely overlap in the frequency domain. If the UE is configured for the U-BWP and the SL-BWP to overlap, in the frequency domain where the U-BWP and the SL-BWP overlap, the UE may perform both the transmission/reception operation for the U-BWP and the operation for the SL-BWP. That is, in a region where the U-BWP and the SL-BWP overlap, the UE may simultaneously perform signal transmission to the base station and signal transmission to another UE, or simultaneously perform signal reception from the base station and signal reception from another UE.

Meanwhile, in a frequency domain that does not overlap with the U-BWP among the frequency domains of the SL-BWP, the UE does not perform the operation for the SL-BWP, that is, the transmission/reception operation between UEs. The operation for the SL-BWP may include reception and decoding of sidelink control information, identification of sidelink frequency domain or channel occupation, reception and decoding of sidelink data, transmission of sidelink control information and data, and the like. This may mean not performing a sidelink operation in a frequency domain other than the U-BWP so as to perform transmission or reception of the U-BWP.

Case 2: A UE operation is provided when the U-BWP and the SL-BWP do not overlap in the frequency domain. This embodiment does not perform the transmission/reception operation between UEs. The operation for the SL-BWP may include reception and decoding of sidelink control information, identification of sidelink frequency domain or channel occupation, reception and decoding of sidelink data, transmission of sidelink control information and data, and the like. This embodiment may mean not performing a sidelink operation in a frequency domain other than the U-BWP so as to perform signal transmission or reception via the U-BWP.

Third Embodiment

The third embodiment provides a structure of physical channels in a sidelink slot, and provides a method and device for performing channel sensing for checking whether a resource for sidelink transmission is empty (or occupied).

Figure 13:
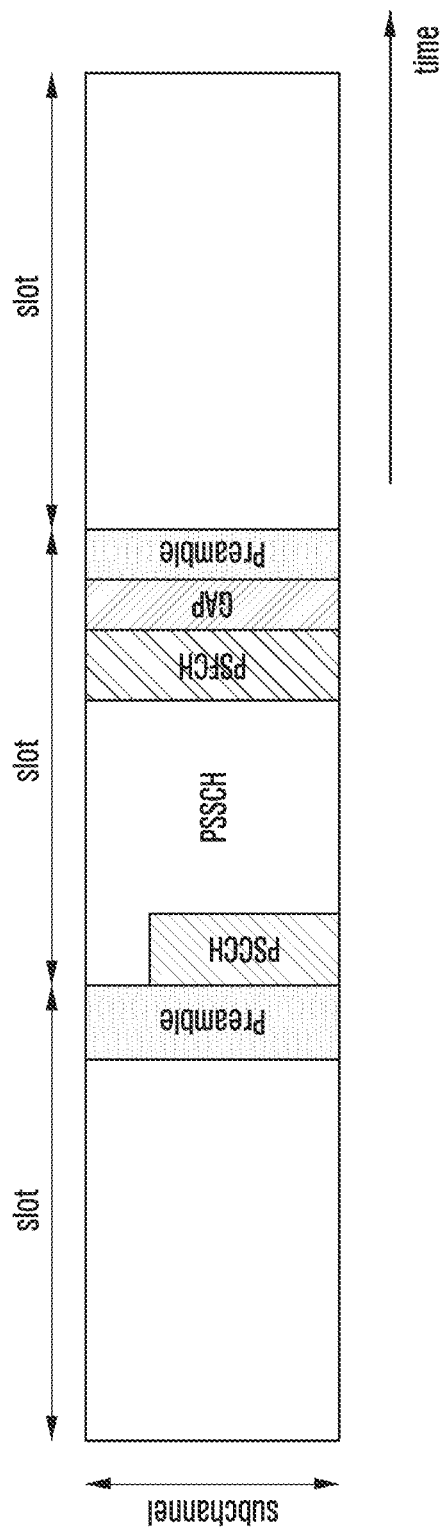
FIG. 13 is a diagram illustrating an example of transmitting a physical channel for sidelink transmission in one slot according to an embodiment of the disclosure.

FIG. 13 is a diagram illustrating an example of transmitting a physical channel for sidelink transmission in one slot according to an embodiment of the disclosure.

Control information may be transmitted through the PSCCH, which is a control channel, in preceding symbols of the slot, data may be transmitted through a physical sidelink shared channel (PSSCH) which is a data channel, and feedback information may be transmitted through a physical sidelink feedback channel (PSFCH) which is a feedback channel. A preamble may be transmitted before the slot containing at least one of channels PSCCH, PSSCH, and PSFCH for transmitting a control signal, data, or a feedback signal in the sidelink. The purpose of transmitting the preamble is to enable a receiving end receiving the signal transmitted via the sidelink to adjust an amplification gain of an amplifier by performing automatic gain control (AGC) before receiving the actual control channel or data channel.

A GAP after the PSFCH may be a region in which transmission/reception of signals is not performed, and the GAP time may be a time used for the UE to switch from transmission to reception, and vice versa.

The number or time of symbols used for preamble transmission may be determined based on a subcarrier spacing (SCS) used for sidelink transmission. For example, if an SCS of 15 kHz is used for the sidelink transmission, one symbol may be used for the preamble transmission, and if an SCS of 30 kHz is used, two symbols may be used.

What μ is 0, 1, 2, or 3 may correspond to a subcarrier interval of 15 kHz, 30 kHz, 60 kHz, or 120 kHz, respectively, and the number of symbols used in the preamble may be 2μ. Also, the length of the preamble to be transmitted by a transmitting end may be provided as a formula for μ, such as 2μ×60 usec. The preamble may be transmitted in the last symbols of a previous slot of a slot in which a transmitting UE in the sidelink intends to transmit one or more of the PSCCH, the PSSCH, and the PSFCH, but the preamble may not always be transmitted. For example, when the transmitting UE attempts to transmit the PSCCH, the PSSCH, or the PSFCH in a slot n, the UE may transmit the preamble in the last symbols of a slot n−1 or during the last specific time of the slot n−1. For example, when a certain UE transmits one or more of the PSCCH, the PSSCH, and the PSFCH in two consecutive slots in the sidelink, the preamble transmission may be omitted.

When receiving a signal, the UE may perform a step of amplifying the received signal. How much the received signal is amplified in the amplifying step may be determined based on the strength of the signal and a dynamic range of a UE amplifier. The dynamic range may mean a range of signal strength in which an input and an output of the amplifier have a linear relationship. If there is no linear relationship between the input and the output of the amplifier and a phase is changed arbitrarily, that signal may not be available for data reception.

However, when an amplification degree is too large, the signal is not amplified to a certain strength or more, and the phase is changed arbitrarily. Thus, the UE cannot arbitrarily greatly amplify the received signal. In addition, if the amplification degree is too small, data reception performance may be deteriorated. Therefore, the UE needs to amplify the received signal with an appropriate strength. When the UE performs amplification, it may be important to first find out the strength of the received signal. This is, for example, to perform an operation of reducing the amplification degree when the received signal strength is too large and increasing the amplification degree when the received signal strength is too small. As such, the UE needs to change the degree of amplification according to the strength of the received signal, and this operation is called automatic gain control (AGC).

The received signal (input signal) of the UE is first amplified through a variable gain amplifier (VGA) and delivered to a detector for estimating the amplification strength. An error amp of the UE identifies a difference value by comparing the estimated signal strength with a reference value (set point) determined by the dynamic range of the UE, and this value is delivered as a parameter of the VGA. The amplification degree is determined in the VGA according to the difference between the estimated signal strength and the reference value, and the amplification degree serves to allow the amplified signal to be included in the dynamic range of the UE amplifier. After all, the AGC operation may be a step of determining how much to amplify the received signal.

Figure 14:
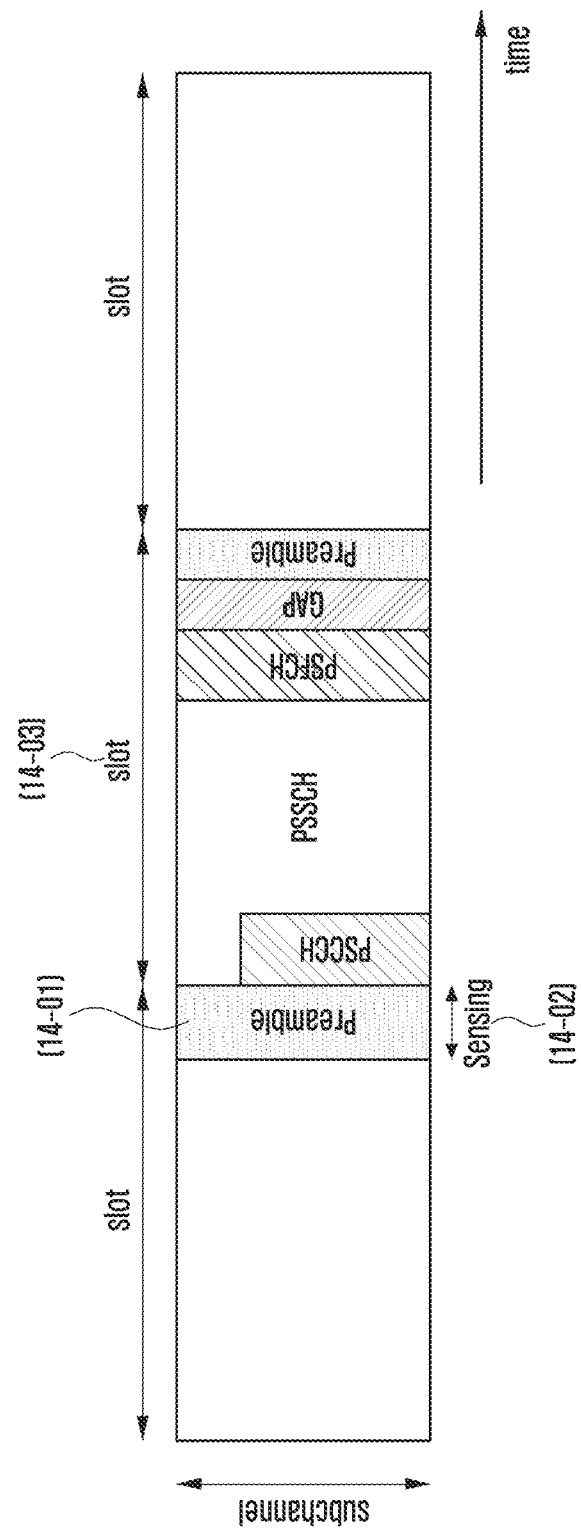
FIG. 14 is a diagram illustrating an example that physical channels are transmitted via one slot in a sidelink according to an embodiment of the disclosure.

FIG. 14 is a diagram illustrating an example that physical channels are transmitted via one slot in a sidelink according to an embodiment of the disclosure.

Before transmitting data through a specific slot, the UE may perform a channel access process or listen-before-talk (LBT) for determining whether a channel is empty. In the disclosure, the step of determining that transmission is possible because the channel is empty may be referred to as channel access, LBT, energy detection, or the like. In this channel access step, the UE may measure the power or energy of the received signal and compare the measured power or energy with a previously fixed or predetermined value. Therefore, if the measured value is greater than the previously fixed or predetermined value, it may be assumed that the channel is occupied and another UE is transmitting a signal through the channel, and if the measured value is less than the previously fixed or predetermined value, it may be determined that the channel is empty and the UE can transmit a signal through the channel.

The channel access of the UE may be performed in at least one symbol 14-02 before a slot 14-03 in which the UE intends to transmit a sidelink signal. The at least one symbol 14-02 may be a symbol in which a preamble should be transmitted first in order to transmit the sidelink signal in the next slot 14-03.

Therefore, determining that another UE is transmitting a signal, in the at least one symbol 14-02 by performing the channel access, may mean that the UE having transmitted the preamble in the symbol transmits one or more of PSCCH, PSSCH and PSFCH in the next slot 14-03 and that the slot 14-03 has been already occupied.

A start time at which the UE performs the channel access may be determined as an arbitrary or random value from the first symbol of the symbols 14-02 included in a slot before the slot 14-03 in which the UE intends to transmit the sidelink signal, or determined based on a QoS value such as priority or latency transmitted on a higher level for the signal to be transmitted.

For example, when the last symbols of the slot n−1 (i.e., a slot before a slot for transmitting the sidelink signal) for transmitting the preamble are determined and given, it may mean that the UE performs the channel access in the first section of the symbols. Specifically, when it is configured or predetermined to transmit the preamble in the 12th and 13th symbols of the slot n−1, it may mean that the channel access is performed for a specific time from the beginning of the 12th symbol. The specific time may be fixed in advance, but may be an arbitrarily selected time interval. In the disclosure, when a sidelink signal is referred to, it may mean one or more of PSCCH, PSSCH, and PSFCH.

Figure 15:
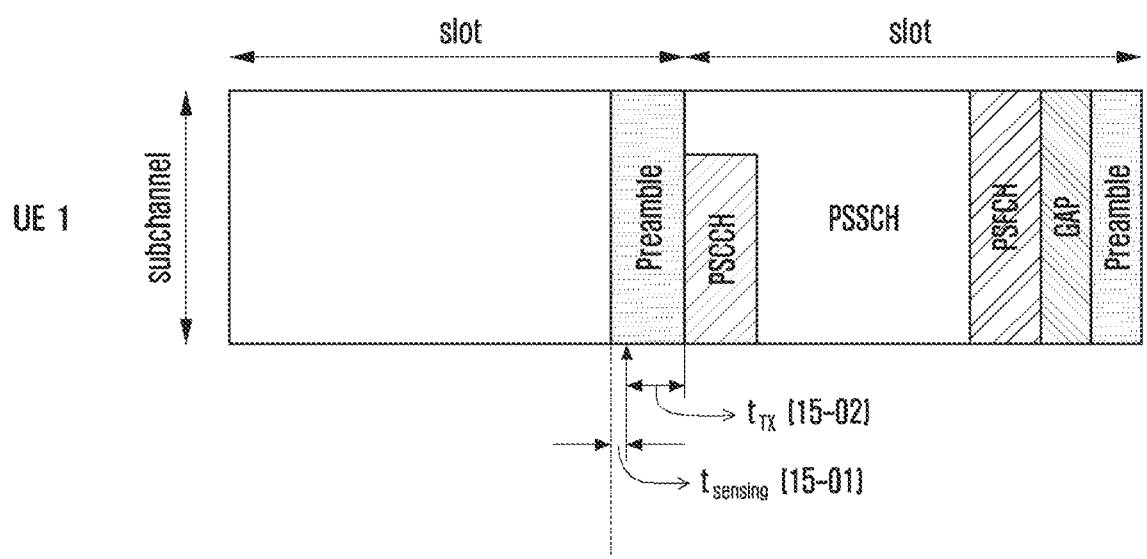
FIG. 15 is a diagram illustrating an example that a UE performs channel access and transmits a signal according to an embodiment of the disclosure.

FIG. 15 is a diagram illustrating an example that a UE performs channel access and transmits a signal according to an embodiment of the disclosure.

In this embodiment, it is assumed that a section capable of transmitting a preamble before a slot in which the UE intends to transmit a sidelink signal is defined or configured as two symbols. Embodiments of the disclosure are not limited thereto, and the number of symbols in the section capable of transmitting the preamble may be changed.

The UE may determine $t_{sensing}$ 15-01, which is the time to perform the channel access based on a QoS parameter or a selected arbitrary value, and perform the channel access during $t_{sensing}$ 15-01 from the beginning of the section in which the preamble is to be transmitted. Performing the channel access may include a process of measuring the received signal strength or the like during the corresponding section. If it is determined by performing the channel access in the section 15-01 that the channel can be used, the UE can transmit in the remaining preamble transmission section tTx 15-02 a preamble signal that has been already defined or determined arbitrarily by the UE. Thereafter, when a slot time for transmitting the sidelink signal starts, the UE transmits a desired physical channel or signal.

Figure 16:
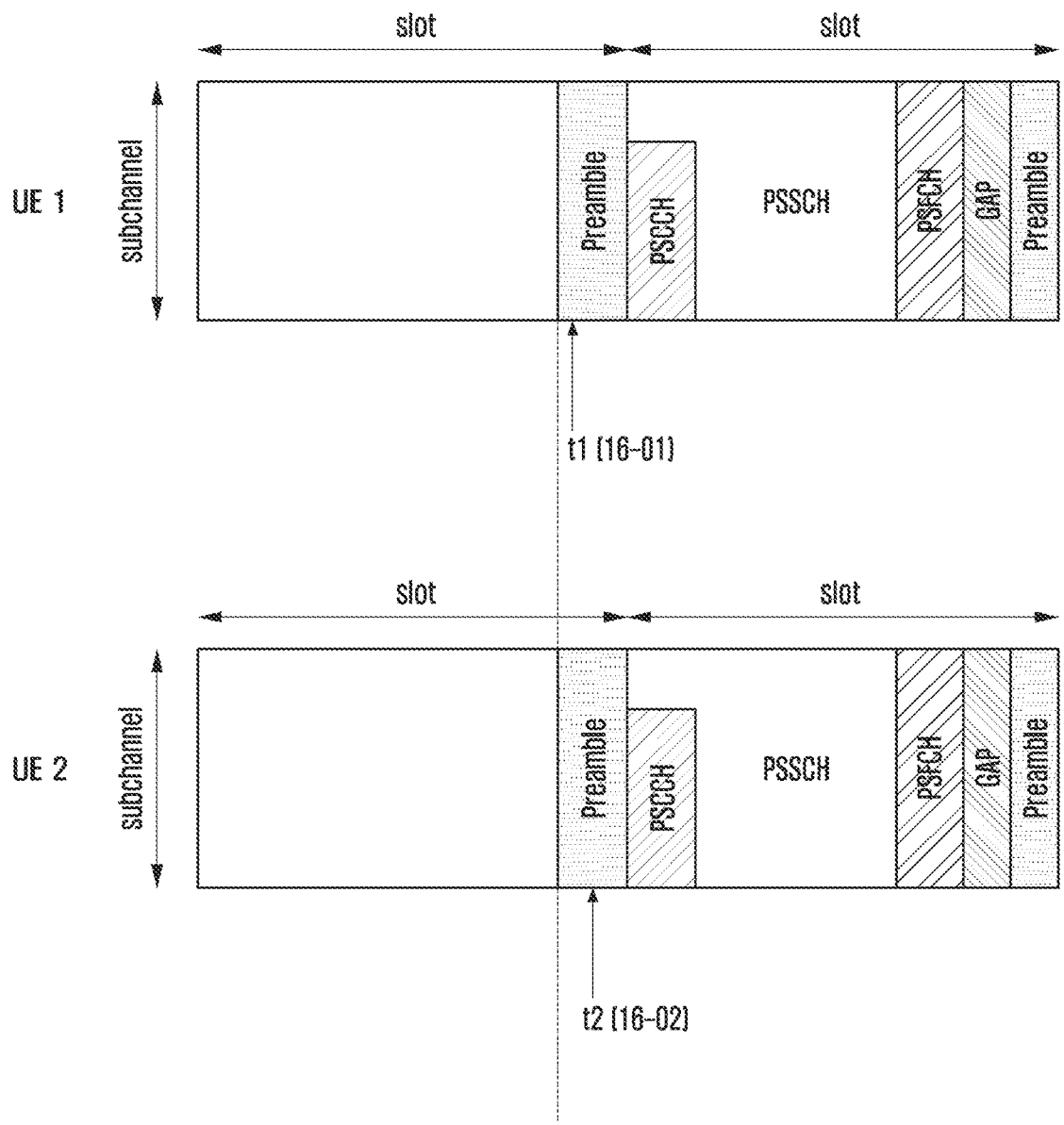
FIG. 16 is a diagram illustrating an example that, when there are at least two UEs, the at least two UEs perform channel access and transmit a preamble according to an embodiment of the disclosure.

FIG. 16 is a diagram illustrating an example that, when there are at least two UEs, the at least two UEs perform channel access and transmit a preamble according to an embodiment of the disclosure.

As shown in FIG. 15, two UEs (UE 1 and UE 2) may determine channel access times $t_1$ 16-01 and $t_2$ 16-02, respectively, and perform channel access. In this embodiment, a case where $t_2$ which is a channel access time determined by the UE 2 is greater than $t_1$ which is a channel access time determined by the UE 1, that is, a case where the UE 2 performs a channel access procedure longer will be described as an example. However, embodiments of the disclosure are not limited thereto.

When the UE 1 succeeds in channel access and starts to transmit a preamble after the time $t_1$, the UE 2 may fail in channel access due to the preamble transmitted by the UE 1. That is, because the UE 1 first occupies and uses a channel, it may be determined that the UE 2 does not occupy the channel. This method may minimize a case that two UEs determine the channel access time arbitrarily or through the QoS parameter and simultaneously use the sidelink channel (or slot).

If the UE performs the channel access and determines that the channel is empty, that is, if it passes energy detection, or if the measured energy or power value is smaller than a fixed or predetermined value, the UE can transmit the sidelink signal in slots usable for a certain time. The UE performing the channel access and determining that the channel is empty can transmit an arbitrary signal from the time of determining that the channel is empty to the next slot boundary time. The arbitrary signal may be a signal generated by repetition or the like using a symbol to be transmitted in the next slot, or may be one using a fixed or predetermined sequence.

If the UE performs the channel access and determines that the channel is empty, that is, if it passes energy detection, or if the measured energy or power value is smaller than a fixed or predetermined value, the UE can transmit the sidelink signal in slots usable for a certain time. The value of the above certain time may be referred to as a maximum channel occupancy time (MCOT), and this MCOT value may be a previously fixed value, a value configured from the base station to the UE, a value fixedly embedded in the UE, or a value included in the configuration of a BWP or resource pool in which the UE performs the channel access. For example, if the MCOT is configured as 4 in the corresponding resource pool configuration, the UE may transmit a signal through maximally 4 slots when a signal can be transmitted through the channel access. If the MCOT is configured as 0, the UE may consider that a resource pool cannot use the method of occupying a channel through the LBT or channel access and performing transmission.

Figure 17:
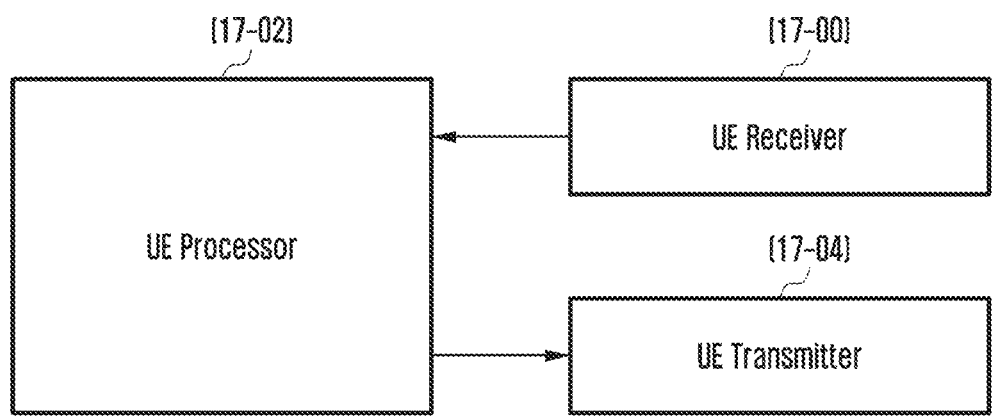
FIG. 17 is a diagram illustrating an internal structure of a UE according to embodiments of the disclosure.
Figure 18:
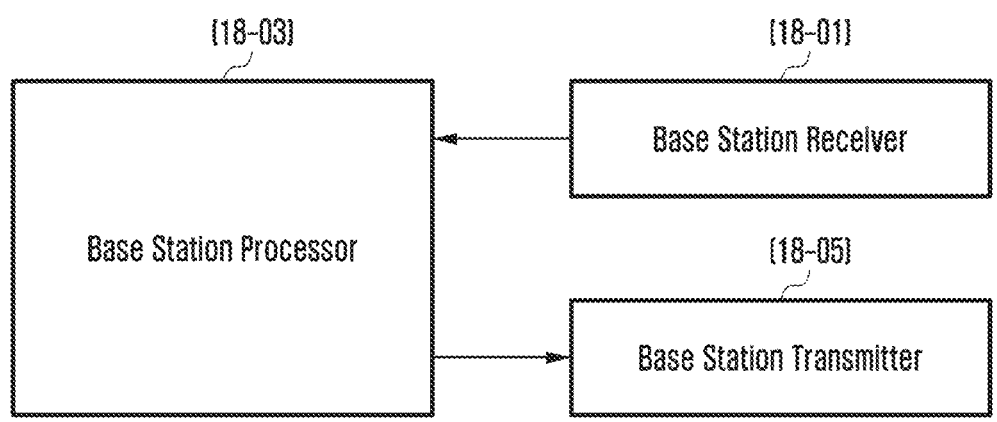
FIG. 18 is a diagram illustrating an internal structure of a base station according to embodiments of the disclosure.

A transmitter, a receiver, and a processor of a UE and a base station for performing the embodiments of the disclosure are illustrated in FIGS. 17 and 18, respectively. In order to perform the operations proposed in the embodiments of the disclosure, each of the receiver, the processor, and the transmitter of the base station and the UE should operate in accordance with the embodiments.

Specifically, FIG. 17 is a diagram illustrating an internal structure of a UE according to embodiments of the disclosure.

As shown in FIG. 17, the UE of the disclosure may include a UE receiver 17-00, a UE transmitter 17-04, and a UE processor 17-02. The UE receiver 17-00 and the UE transmitter 17-04 may be collectively referred to as a transceiver in embodiments of the disclosure. The transceiver may transmit and receive a signal to and from the base station.

The signal may include control information and data. To this end, the transceiver may include an RF transmitter for up-converting and amplifying a frequency of a signal to be transmitted, and an RF receiver for low-noise amplifying and down-converting a received signal.

In addition, the transceiver may receive a signal through a radio channel, output it to the UE processor 17-02, and transmit a signal outputted from the UE processor 17-02 through the radio channel. The UE processor 17-02 may control a series of processes so that the UE can operate in accordance with the above-described embodiments of the disclosure. For example, the UE receiver 17-00 may receive control information including scheduling information from the base station, and the UE processor 17-02 may determine the minimum processing time depending on whether the BWP is switched, and perform signal processing accordingly. Thereafter, the UE transmitter 17-04 may perform uplink transmission corresponding to the control information.

FIG. 18 is a diagram illustrating an internal structure of a base station according to embodiments of the disclosure.

As shown in FIG. 18, the base station of the disclosure may include a base station receiver 18-01, a base station transmitter 18-05, and a base station processor 18-03. The base station receiver 18-01 and the base station transmitter 18-05 may be collectively referred to as a transceiver in the embodiments of the disclosure. The transceiver may transmit and receive a signal to and from the UE.

The signal may include control information and data. To this end, the transceiver may include an RF transmitter for up-converting and amplifying a frequency of a signal to be transmitted, and an RF receiver for low-noise amplifying and down-converting a received signal. In addition, the transceiver may receive a signal through a radio channel, output it to the base station processor 18-03, and transmit a signal outputted from the base station processor 18-03 through the radio channel. The base station processor 18-03 may control a series of processes so that the base station can operate in accordance with the above-described embodiments of the disclosure. For example, the base station processor 18-03 may determine the minimum processing time depending on whether the BWP is switched and control to determine a second signal transmission timing accordingly. Thereafter, the base station transmitter 18-05 transmits control information accompanying the determined timing information, and the base station receiver 18-01 receives a second signal from the UE at the timing.

Meanwhile, embodiments of the disclosure and the accompanying drawings are only examples presented in order to easily describe the disclosure and facilitate comprehension of the disclosure, but are not intended to limit the scope of the disclosure. That is, it is apparent to a person skilled in the art that other modifications based on technical ideas of the disclosure can be implemented. In addition, the above-described embodiments may be used in combination with each other as needed. For example, it may be possible to apply the first embodiment and the second embodiment in combination, or to apply a part of the first embodiment and a part of the second embodiment in combination. In addition, the above embodiments and their modifications may be implemented in the LTE system, the 5G system, and the like.

The invention claimed is:

1. A method of a terminal in a wireless communication system, the method comprising:
   receiving, from a base station, configuration information for sidelink (SL) bandwidth part (BWP), wherein the configuration information includes a resource pool configuration for the SL BWP;
   identifying a resource pool based on the resource pool configuration; and
   performing sidelink communication with another terminal based on the resource pool,
   wherein the resource pool configuration includes information indicating a lowest resource block (RB) index of the resource pool with respect to a lowest RB index of the SL BWP.

2. The method of claim 1, wherein the lowest RB index of the resource pool is indicated with an offset value from the lowest RB index in the SL BWP.

3. The method of claim 1, wherein the resource pool configuration includes information for a number of RBs included in the resource pool, and
   wherein the resource pool includes a number of contiguous RBs from a RB having the lowest RB index of the resource pool.

4. The method of claim 1,
   wherein
   a symbol preceding a first symbol of a physical sidelink control channel (PSCCH) and associated physical sidelink shared channel (PSSCH) is used for an automatic gain control (AGC).

5. The method of claim 1, wherein a symbol following a last symbol of a physical sidelink feedback channel (PSFCH) is used as a gap.

6. A terminal in a wireless communication system, the terminal comprising:
   a transceiver; and
   a controller configured to:
     receive, from a base station via the transceiver, configuration information for sidelink (SL) bandwidth part (BWP), wherein the configuration information includes a resource pool configuration for the SL BWP,
     identify a resource pool based on the resource pool configuration, and
     perform sidelink communication with another terminal based on the resource pool,
   wherein the resource pool configuration includes information indicating a lowest resource block (RB) index of the resource pool with respect to a lowest RB index of the SL BWP.

7. The terminal of claim 6, wherein the lowest RB index of the resource pool is indicated with an offset value from the lowest RB index in the SL BWP.

8. The terminal of claim 6,
   wherein the resource pool configuration includes information for a number of RBs included in the resource pool, and
   wherein the resource pool includes a number of contiguous RBs from a RB having the lowest RB index of the resource pool.

9. The terminal of claim 6,
   wherein
   a symbol preceding a first symbol of a physical sidelink control channel (PSCCH) and associated physical sidelink shared channel (PSSCH) is used for an automatic gain control (AGC).

10. The terminal of claim 6, wherein a symbol following a last symbol of a physical sidelink feedback channel (PSFCH) is used as a gap.

* * * * *